United States Patent
Dao et al.

(10) Patent No.: US 10,630,506 B2
(45) Date of Patent: Apr. 21, 2020

(54) METHOD AND APPARATUS FOR DATA TRANSMISSION INVOLVING TUNNELING IN WIRELESS COMMUNICATION NETWORKS

(71) Applicants:Ngoc Dung Dao, Ottawa (CA); Xu Li, Nepean (CA); Hang Zhang, Nepean (CA)

(72) Inventors: Ngoc Dung Dao, Ottawa (CA); Xu Li, Nepean (CA); Hang Zhang, Nepean (CA)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 132 days.

(21) Appl. No.: 15/704,819

(22) Filed: Sep. 14, 2017

(65) Prior Publication Data
US 2018/0097657 A1    Apr. 5, 2018

Related U.S. Application Data

(60) Provisional application No. 62/402,666, filed on Sep. 30, 2016, provisional application No. 62/405,348, filed on Oct. 7, 2016.

(51) Int. Cl.
*H04L 12/26* (2006.01)
*H04L 12/46* (2006.01)
(Continued)

(52) U.S. Cl.
CPC ...... *H04L 12/4633* (2013.01); *H04L 41/0806* (2013.01); *H04L 41/0893* (2013.01);
(Continued)

(58) Field of Classification Search
None
See application file for complete search history.

(56) References Cited

U.S. PATENT DOCUMENTS

| 2011/0032677 A1* | 2/2011 | Chall ............... G06F 1/3203 361/707 |
| 2011/0122844 A1 | 5/2011 | Harper et al. |

(Continued)

FOREIGN PATENT DOCUMENTS

| CN | 102695236 A | 9/2012 |
| CN | 103096314 A | 5/2013 |

(Continued)

OTHER PUBLICATIONS

3GPP Study on Architecture for Next Generation System (Release 14), 3GPP TR 23.799 V1.0.1, 3rd Generation Partnership Project; Technical Specification Group Services and System Aspects; Sep. 28, 2016.
(Continued)

*Primary Examiner* — Brandon M Renner

(57) ABSTRACT

A method and apparatus for connecting a user equipment (UE) to a wireless communication network such as a $5^{th}$ generation network. The network supports node-level tunneling. Node-level tunnels can be pre-configured prior to receipt of UE attach requests. The tunnels can be shared by plural UEs, flows, or services. A policy function is connected to a network management function and performs tasks such as applying constraints to the node-level tunnels. A session management function pre-establishes node-level tunnels based on policy information from the policy function. Operations of network elements such as the access network node and user plane function to handle UE attachment, session establishment, and handling of mobile-originated and mobile-terminated traffic are described. Also described is a method and apparatus for packet transmission in which packets are processed according to an identified tunnel type. The tunnel type can be identified using a field in the tunnel encapsulation header.

24 Claims, 25 Drawing Sheets

(51) Int. Cl.
  *H04L 12/24* (2006.01)
  *H04L 12/801* (2013.01)
  *H04L 12/823* (2013.01)
  *H04L 29/08* (2006.01)
  *H04L 29/06* (2006.01)
  *H04W 88/02* (2009.01)

(52) U.S. Cl.
  CPC .............. *H04L 47/12* (2013.01); *H04L 47/32* (2013.01); *H04L 67/14* (2013.01); *H04L 69/22* (2013.01); *H04W 88/02* (2013.01)

(56) References Cited

U.S. PATENT DOCUMENTS

| | | | |
|---|---|---|---|
| 2011/0264905 A1* | 10/2011 | Ovsiannikov | H04L 29/08792 713/151 |
| 2015/0098325 A1* | 4/2015 | Lu | H04L 12/1407 370/230 |
| 2015/0181630 A1* | 6/2015 | Miyagawa | H04W 12/08 370/315 |
| 2015/0381761 A1 | 12/2015 | Suni et al. | |
| 2016/0127136 A1* | 5/2016 | Yin | H04L 12/12 370/218 |
| 2016/0323782 A1* | 11/2016 | Baillargeon | H04W 28/0284 |
| 2017/0257309 A1* | 9/2017 | Appanna | H04L 45/245 |
| 2017/0289265 A1* | 10/2017 | Faccin | H04W 48/17 |

FOREIGN PATENT DOCUMENTS

| | | |
|---|---|---|
| CN | 103747502 A | 4/2014 |
| WO | 2008047930 A1 | 4/2008 |

OTHER PUBLICATIONS

International Search Report dated Dec. 28, 2017 for corresponding International Application No. PCT/CN2017/104082 filed Sep. 28, 2017.

3GPP (Release 13), 3GPP TS 32.401 V13.2.0, 3rd Generation Partnership Project; Technical Specification Group Services and System Aspects; Jun. 2017.

* cited by examiner

| Bits | | | | | | | | |
|---|---|---|---|---|---|---|---|---|
| Octets | 8 | 7 | 6 | 5 | 4 | 3 | 2 | 1 |
| 1 | Version | | | PT | (*) | E | S | PN |
| 2 | Message Type | | | | | | | |
| 3 | Length (1st Octet) | | | | | | | |
| 4 | Length (2nd Octet) | | | | | | | |
| 5 | Tunnel Endpoint Identifier (1st Octet) | | | | | | | |
| 6 | Tunnel Endpoint Identifier (2nd Octet) | | | | | | | |
| 7 | Tunnel Endpoint Identifier (3rd Octet) | | | | | | | |
| 8 | Tunnel Endpoint Identifier (4th Octet) | | | | | | | |
| 9 | Sequence Number (1st Octet)[1) 4)] | | | | | | | |
| 10 | Sequence Number (2nd Octet)[1) 4)] | | | | | | | |
| 11 | N-PDU Number[2) 4)] | | | | | | | |
| 12 | Next Extension Header Type[3) 4)] | | | | | | | |

FIG. 13

| Octets | Bits | | | | | | | |
|---|---|---|---|---|---|---|---|---|
| | 8 | 7 | 6 | 5 | 4 | 3 | 2 | 1 |
| 1 | Version | | | PT | (*) | E | S | PN |
| 2 | Message Type | | | | | | | |
| 3 | Length (1st Octet) | | | | | | | |
| 4 | Length (2nd Octet) | | | | | | | |
| 5 | Tunnel Endpoint Identifier (1st Octet) | | | | | | | |
| 6 | Tunnel Endpoint Identifier (2nd Octet) | | | | | | | |
| 7 | Tunnel Endpoint Identifier (3rd Octet) | | | | | | | |
| 8 | Tunnel Endpoint Identifier (4th Octet) | | | | | | | |

FIG. 15

METHOD AND APPARATUS FOR DATA TRANSMISSION INVOLVING TUNNELING IN WIRELESS COMMUNICATION NETWORKS

CROSS-REFERENCE TO RELATED APPLICATIONS

The present application claims priority from U.S. Provisional Patent Application No. 62/402,666, filed on Sep. 30, 2016 and U.S. Provisional Patent Application No. 62/405,348, filed on Oct. 7, 2016, both of which are incorporated herein by reference in their entirety.

FIELD OF THE INVENTION

The present invention pertains to the field of wireless communication networks and in particular to a method and apparatus for efficiently transmitting data in such networks, and in which node-level tunneling protocols are involved.

BACKGROUND

The $3^{rd}$ Generation Partnership Project (3GPP) technical report numbered TR 23.799 and entitled "Study on Architecture for Next Generation System," version 1.0.0, September 2016 (hereinafter referred to as TR 23.799), represents one approach to the design of a system architecture for next generation mobile networks, also referred to as $5^{th}$ generation (5G) networks. Section 6.4 of this document considers potential solutions to the key issue of session management in such networks. Subsection 6.4.11 of the same document considers a user plane (UP) protocol model involving per node-level tunneling, proposed as a solution for supporting session management. In particular, a common tunnel is provided for all traffic between each relevant pair of network functions. However, the proposals outlined in TR 23.799 are subject to development and improvement.

Furthermore, network operators serve various sets of demands for different types of user equipment (UE) accessing different services. It is expected that future networks will require increasing flexibility to accommodate an increasing number of devices, types of devices and services. In current LTE networks, user plane traffic flows between an eNodeB (eNB), service gateway (SGW) and packet (PGW).

GPRS Tunneling Protocol (GTP) is an internet protocol/ user datagram protocol (IP/UDP)-based protocol that can be used to carry tunnel-specific signaling traffic between Global System for Mobile Communications (GSM), Universal Mobile Telecommunications System (UMTS) and 3GPP Long Term Evolution (LTE) core networks. GTP protocols enable user equipment (UE) mobility by maintaining a constant IP address or tunnel through which user packets are transmitted regardless of UE location. Multiple tunnels between virtual network endpoints can be specified through GTP protocols to customize services available to the same UE or subscriber.

GTP-U is a simple IP-based form of GTP protocol which enables user traffic to be transmitted across tunnels selected from multiple available tunnels between virtual network endpoints. In LTE, user IP-encapsulated packets are transmitted in an uplink path tunnel along the evolved Universal Terrestrial Radio Access Network (eUTRAN) control plane to the evolved NodeB (eNodeB) base station. At the eNodeB, packets are appended with a UDP header specifying a Tunnel Endpoint Identifier (TEID), which specifies which user plane (UP) tunnel within the virtual network packets will be forwarded through depending on the service required. A similar process of encapsulating and transmitting user packets along TEID-defined tunnels between virtual network endpoints can also be employed along a downlink tunnel path that terminates at an eNodeB base station. However, as the number of devices and services offered increases, a more flexible approach is needed.

Therefore there is a need for a method and apparatus for efficiently transmitting data in wireless communication networks such as proposed 5G networks, in which per node-level tunneling is involved, that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for efficiently transmitting data in wireless communication networks such as proposed 5G networks, in which per node-level tunneling is involved.

In accordance with embodiments of the present invention, there is provided a method for providing a node-level tunnel in a communication network. The method may be performed by a session management function operating in the communication network, or a corresponding apparatus comprising a processor, memory, and network interface. The method includes receiving policy information from a policy function. The method further includes establishing the node-level tunnel based on the received policy information. The node-level tunnel is established prior to reception, by the session management function, of session requests involving a User Equipment (UE), the session requests to be accommodated using the node-level tunnel.

In accordance with embodiments of the present invention, there is provided a session management function operating in a communication network. The session management function may be embodied in an equivalent network apparatus. The session management function is operated using a processor, a memory and a network interface. The session management function is configured to receive, via the network interface, policy information from a policy function. The session management function is further configured to establish, via instructions transmitted through the network interface, a node-level tunnel in the communication network based on the received policy information, The node-level tunnel is established prior to reception, by the session management function, of session requests involving a User Equipment (UE), the session requests to be accommodated using the node-level tunnel.

The node-level tunnel may be configured based on logical network configuration information, stored information related to the UE, or both. Associating the node-level tunnel with UE context information may be performed upon request by an access node and may include transmitting the context information to the access node. Associating the node-level tunnel with the UE context information may include selecting one of a plurality of pre-configured node-level tunnels as the node-level tunnel, based on the policy information and further information, such as selection assistance information, provided by the access network node.

In some embodiments, the session management function may pre-assign, based on the policy information, one or more data flows, session, and UEs to one of a plurality of node-level tunnels, including the node level tunnel.

In some embodiments, the policy information includes one or more of: Quality of Service (QoS) information for the UE; charging policies for the UE; a traffic routing policy for the UE; a maximum bit rate to be accommodated by the node-level tunnel; a maximum number of UEs having traffic carried by the node-level tunnel; a designation of types of devices to be served by the node-level tunnel; and an indication of types of services to be served by the node-level tunnel.

In some embodiments, the policy is indicative that, when congestion occurs at an exit node of the node-level tunnel, packets are to be dropped at an entrance node of the node-level tunnel, the session management function further configured to instruct the entrance node to drop packets in response to congestion at the exit node.

In some embodiments, the node-level tunnel is shared by a group of UEs defined by a predetermined characteristic and consisting of less than all UEs, or the pre-configured node-level tunnel is used to provide a particular service to the UE, the service belonging to a group of services defined by a predetermined characteristic and consisting of less than all services available.

In accordance with embodiments of the present invention, there is provided a method for connecting a user equipment (UE) to a network. The method comprises, by an access network node: receiving an attach request from the UE, the attach request including destination packet data network information; obtaining UE context (also referred to as context information) corresponding to that UE and attach request; and transmitting an attach complete message to the UE, the attach complete message including a radio resource configuration for use by the UE when performing one or both of: transmitting uplink data; and receiving downlink data.

In some embodiments, the UE context is obtained by matching the received attach request to context information available to the access network node. The access network node may include or be coupled to a storage which stores context information. The storage can be local or dedicated to the access network node. The access network node is configured to check this storage first and retrieve the context information therefrom if available. Otherwise, the access node may interact with other network nodes to create and/or obtain the context information, whereupon the context information is also stored in the storage. The context information can later be deleted in response to a trigger condition.

In some embodiments, the method further includes, prior to receiving the attach request: establishing and maintaining (storing) the context information at the access node, and pre-configuring a node-level tunnel associated with the UE for uplink communication, downlink communication, or both. The node-level tunnel may be used by multiple UEs, for example concurrently, over time, or both.

In some embodiments, the UE context is obtained by the access network node further carrying out the steps of: transmitting an attach request message to control plane functions available on the network; receiving a request from the control plane functions to setup resources, obtain operator policy information, or both, for a session corresponding to the attach request and setting up corresponding session resources; and receiving an attach complete message from the control plane functions.

In some embodiments, the access network node also maintains the received context information in a data store available to the access network node.

In some embodiments, the access network node further receives, from control plane functions available on the network, UE context removal criteria provided by a policy function in communication with the control plane functions and network management; and, if the UE context removal criteria are met, the method further comprises removing the UE context from a data store available to the network access node.

In some embodiments, the UE context removal criteria comprises at least one of: after a timeout period has expired without receiving any uplink or downlink PDU associated with the attachment; and, receiving an updated UE context message from the control plane functions.

In accordance with embodiments of the present invention, there is provided a method for supporting communication in a wireless communication network. The method includes: applying, using a policy function operating within the wireless communication network, constraints on a node-level tunnel used for communicating plural types of traffic between a pair of network functions of the wireless communication network.

In accordance with embodiments of the present invention, there is provided a method for handling mobile-originated packet data traffic in a wireless communication network. The method includes: receiving, from a user equipment (UE), an uplink protocol data unit (PDU) packet at an access network (AN) node over a radio channel; and encapsulating the PDU packet according to a node-level tunnel format and forwarding the encapsulated PDU packet to a user plane function (UPF) via a pre-configured uplink tunnel.

In some embodiments, upon receipt of the PDU packet, the user plane function processes the packet according to a user plane UE context associated with the packet.

Some embodiments further include: receiving, by the user plane function (UPF), a downlink packet for the UE; determining, from the user plane UE context, a pre-configured downlink tunnel toward the access network node, and forwarding the downlink packet via the downlink tunnel.

In accordance with embodiments of the present invention, there is provided a method for handling mobile-terminated packet data traffic in a wireless communication network. The method includes receiving a downlink protocol data unit (PDU) packet at a user plane function (UPF) in the wireless communication network; processing, by the user plane function (UPF), the downlink PDU packet according to a stored user plane user equipment (UE) context; and encapsulating the downlink PDU packet by the user plane function (UPF) and forwarding the encapsulated downlink PDU packet to an access network node via a pre-configured node-level tunnel according to the UE context.

Some embodiments further include by the access node: processing the encapsulated downlink PDU packet according to the stored UE context and tunnel header information provided according to the encapsulation; and forwarding the downlink PDU packet to the UE.

Some embodiments further include receiving an uplink PDU packet from the UE by the access node; processing the uplink PDU packet according to the stored UE context; and encapsulating and forwarding the uplink PDU packet via the pre-configured node-level tunnel according to the stored UE context.

Some embodiments further include receiving the encapsulated uplink PDU packet from the access node by the user plane function (UPF); processing the encapsulated uplink PDU packet according to the stored UE context; removing an encapsulation header of the encapsulated uplink PDU packet; and forwarding the uplink PDU packet.

In accordance with embodiments of the present invention, there is provided an access node of a wireless communication network, the access node comprising a wireless communication interface, a network interface, a microprocessor and a memory. The access node is configured to: receive, via the wireless communication interface, an attach request from the UE, the attach request including destination packet data network information; obtain UE context corresponding to that UE and attach request; and transmit, via the wireless communication interface, an attach complete message to the UE, the attach complete message including a radio resource configuration for use by the UE when performing one or both of: transmitting uplink data; and receiving downlink data.

In accordance with embodiments of the present invention, there is provided an apparatus implementing a policy function in a wireless communication network, the apparatus comprising a network interface, a microprocessor, and a memory. The policy function is configured to apply constraints on a node-level tunnel used for communicating plural types of traffic between a pair of network functions of the wireless communication network. A tunnel can be constrained to carry only certain traffic. Furthermore, multiple node-level tunnels between the same pair of nodes can be provided, each constrained to carry different traffic.

The node-level tunnel can be preconfigured to transfer different traffic types from a group of users, which may have certain QoS requirements. Between two network functions, there can be multiple node-level tunnels for different groups of users or different traffic types. Embodiments of the present invention include node-level tunnels which provide flexible packet transfer, while simplifying the session establishment procedures for certain types of UE, such as fixed devices, or certain types of traffic from a group of users, or traffic of certain services.

In accordance with embodiments of the present invention, there is provided an access node of a wireless communication network, the access node comprising a wireless communication interface, a network interface, a processor (e.g. microprocessor) and a memory. The access node is configured to: receive, from a user equipment (UE) via the wireless communication interface, an uplink protocol data unit (PDU) packet at an access network node over a radio channel; encapsulate the PDU packet according to a node-level tunnel format; and forward the encapsulated PDU packet to a user plane function (UPF) via a pre-configured uplink tunnel.

In accordance with embodiments of the present invention, there is provided an apparatus implementing a user plane function (UPF) in a wireless communication network, the apparatus comprising a network interface, a microprocessor, and a memory. The apparatus is configured to: receive, via the network interface, a downlink protocol data unit (PDU) packet; process, the downlink PDU packet according to a stored user plane user equipment (UE) context; encapsulate the downlink PDU packet by the user plane function (UPF); and forward, via the network interface, the encapsulated downlink PDU packet to an access network node via a pre-configured node-level tunnel according to the UE context.

Aspects of the present invention provide systems and methods for customized service processing of packets based on virtual network tunneling. In accordance with an aspect of the present invention, there is provided a system, apparatus and method for facilitating data packet traffic forwarding by encapsulating packets according to a service and transmitting the packets through virtual network tunnels. Different types of tunnels can be used to support different types of data flows (e.g. video flows, voice flows) or services (e.g. Amazon cloud service), or UE groups (e.g. Internet of Thing (IoT) electricity devices), or user groups (e.g. users who have the same service level agreement). Encapsulation headers can be customized to identify the type of tunnel. Some embodiments can be used with the GTP-U protocol to identify tunnel types. Other embodiments can be used with other (or possibly) new protocols.

BRIEF DESCRIPTION OF THE FIGURES

Further features and advantages of the present invention will become apparent from the following detailed description, taken in combination with the appended drawings, in which:

FIG. 13 is a table of the information carried in the GTP-U L4 tunnel Encapsulation Header.

FIGS. 15 and 16 illustrate two different formats for the compact encapsulation headers, according to embodiments of the present invention.

It will be noted that throughout the appended drawings, like features are identified by like reference numerals.

DETAILED DESCRIPTION

Figure 1:
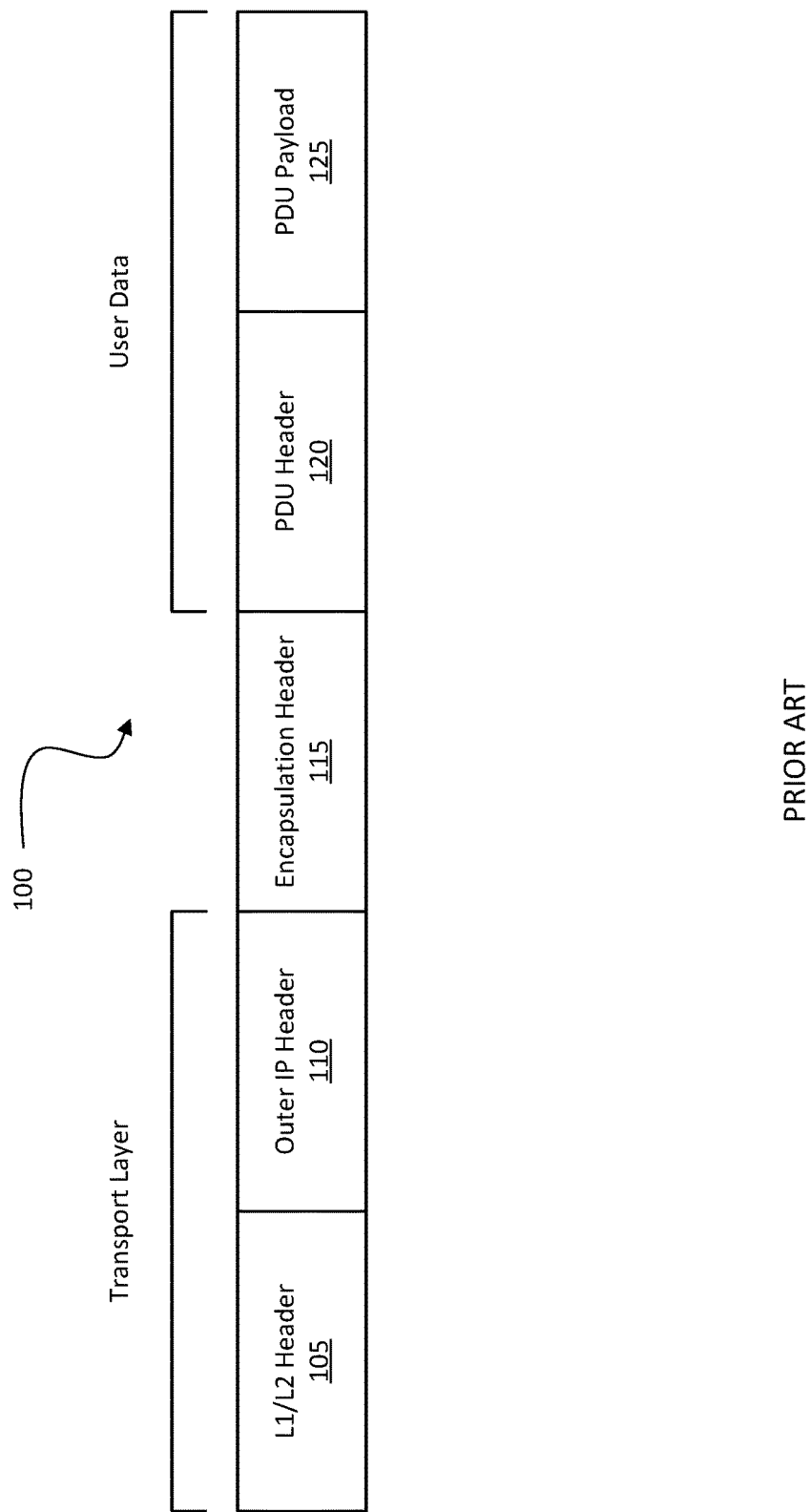
FIG. 1 illustrates a packet structure in accordance with the prior art.

As used herein, the term "User Equipment" (UE) is used for purposes of clarity. However, the UE may refer to one of a variety of devices, generally referred to herein by the term "mobile devices" and including mobile stations, terminals or nodes, fixed or stationary devices, stations, terminals, or nodes, human-type communication devices, machine-type communication (MTC) devices, Internet of Things (IoT) devices, or other wireless end nodes, which communicate with a radio access node via wireless communication. One skilled in the art will appreciate that a mobile device is a device designed to connect to a mobile network. This connection typically makes use of a wireless connection to an access node. Although the mobile network is designed to support mobility, it is not necessary that the mobile device itself be mobile. Some mobile devices, such as metering devices (e.g. smart meters) may not be capable of mobility, but still make use of the mobile network.

Referring to a communication network, the physical network configuration is described by physical nodes, and physical links connecting physical nodes. According to various embodiments, each physical node has a number of input ports and output ports. Physical links connect output ports of physical nodes to input ports of other physical nodes. The physical nodes have at least the following parameters: a number of flows which can be simultaneously supported, the number of input and output ports, the total average bit rate per unit time and the total average packet rate per unit time that can be transferred through physical node, and a geographical location. Each port has at least the following parameters: a bit rate per unit time and a packet rate per unit time, and a buffer size. The physical links have at least the following parameters: a medium type (such as optical cable, or microwave), a bit rate per unit time, a packet rate per unit time, and a transmission cost per data unit. Each physical node has an identifier number (ID), which may be for example an IP address. Each port also has a port ID. A logical link can have a single-valued ID, or the logical link can be identified by a tuple, for example having the form: <source ID, source port ID, destination ID, destination port ID>.

Still referring to the communication network, the logical network configuration provides an abstraction of a physical network. The logical network is described by a logical node and logical links connecting logical nodes. A logical node can reside in a physical network node, or in a data centre, which includes multiple physical network nodes. A logical node can have a number of ports to connect to other logical nodes. A logical link connects a port of a logical node to another port of another logical node. A logical link can consist of multiple physical links that provide connections between two physical network nodes hosting logical nodes. Each logical node has at least the following parameters: an average bitrate per unit time, an average packet rate per unit time, a number of flows which can be simultaneously supported, a number of input and output ports, and a geographic location. Each port has at least the following parameter: a bit rate per unit time, a packet rate per unit time, and a buffer size. The logical links have at least the following parameters: an average bitrate per unit time, an average packet rate per unit time, a number of flows which can be simultaneously supported, and a transmission cost per data unit. Each logical node has an identifier number (ID), which may be for example an IP address. Each port also has an ID. A logical link can have a single-valued ID, or the logical link can be identified by a tuple, for example having the form: <source ID, source port ID, destination ID, destination port ID>.

The logical node can host certain network functions, such as control functions in the control plane (CP), packet processing functions for the user plane (UP) in the core network (CN), or radio node functions.

For example, a logical network of a mobile network can comprise UP functions in a core network portion of the network and access network (AN) node functions portion of the network, such as a radio access network (RAN). The logical links can be set up for UP functions and AN nodes. The UPF may be connected to a limited number of AN nodes. For example, a service area of the UPF may be defined as the collection of AN nodes that are logically connected to the UPF in the logical network configuration. The SMF may receive an indication of the service area of the UPF via configuration from Network Management.

A physical network can be divided into multiple network slices. Each network slice can be described by one or both of: a logical network configuration; and a physical network configuration.

The node-level tunnel model is described in TR 23.799. In this tunnel model there is a common tunnel for all traffic between at least some pairs of network functions (NFs). For example, common tunnels may be established between a radio access (RA) node and a user plane (UP) function in the core network (CN) or between two UP functions in the CN. Further constraints on the common tunnel can be applied by a policy function. For example, the common tunnel can be used for a specific network slice, or a group of users, or a particular traffic types, or specific services. According to embodiments of the present invention, traffic to or from multiple UEs can traverse a shared node-level tunnel. Once a shared node-level tunnel is configured, UEs newly operating in a geographic region serviced by the tunnel (e.g. due to mobility or new operation) can begin using the pre-configured tunnel. This can be performed in response to an attach request.

In the existing node-level tunnel solution, there is no identification of the protocol data unit (PDU) session within the outer IP header or the encapsulation header of the packet as conveyed via the tunnel. Instead, the endpoint uses information in the end-user PDU to identify the session. Such information may be, for example, the UE IP address in case of PDU type IP. Furthermore, in case one access network (AN) node connects with one UP accessing multiple data networks (DNs), there may be per-node-per-DN tunnels between the AN and the UP function. Furthermore, for PDU type IP, the PDU session traffic is identified based on UE IP address. This requires UE IP addresses to be unique in one DN to allow unambiguous traffic identification. Furthermore, the encapsulation header may or may not be required, for example to carry an identifier for Quality of Service (QoS) purposes. Furthermore, in case a network node or network function (e.g. UP function) supports multiple IP addresses there may be a need to signal the tunnel endpoint addresses in order to direct the traffic to the right IP address of the node or function. For example, such signaling may be used to support load balancing. Furthermore, the end-user payload layer may be decoupled from the transport layer, allowing different technologies in the transport layer.

Further with respect to the existing node-level tunnel solution, for one AN node, there may be multiple tunnels connecting to different user plane gateways (GWs). The node-level tunnel may be applied to UEs that are stationary and hence do not move. Therefore, the operator can ensure, via configuration, the assignment of non-overlapping IP addresses within one DN to the UEs belonging to (e.g. served via) the same node-level tunnel.

FIG. 1 illustrates the structure of a packet 100 as described in Section 6.4.11 of TR 23.799. The structure is illustrative of the use of the one tunnel per destination configuration. The packet 100 includes transport layer headers including an L1/L2 header 105 and an outer IP header 110, and an encapsulation header 115. The outer IP header 110 may be selected based on the peer destination or node. The encapsulation header 115 may not be required for PDU session identification, but may be required to carry QoS marking. The packet 100 includes user data, including a PDU header 120 and a PDU payload 125. In some embodiments the encapsulation header 115 may be added by the (e.g. 3GPP) network functions, and read by various nodes of the network, such as UP functions, AN nodes, etc. Further headers, such as the L1/L2 header and outer IP header 110 may also be added or modified by the network functions.

According to embodiments of the present invention, the one tunnel per destination configuration of FIG. 1 can be replaced with a one tunnel per destination per group of users or one tunnel per destination per group of services configuration. The same general packet structure can be utilized. As such, multiple tunnels can be associated with the same destination node, each tunnel carrying traffic corresponding to a different group of users, service, or group of services.

Figure 2:
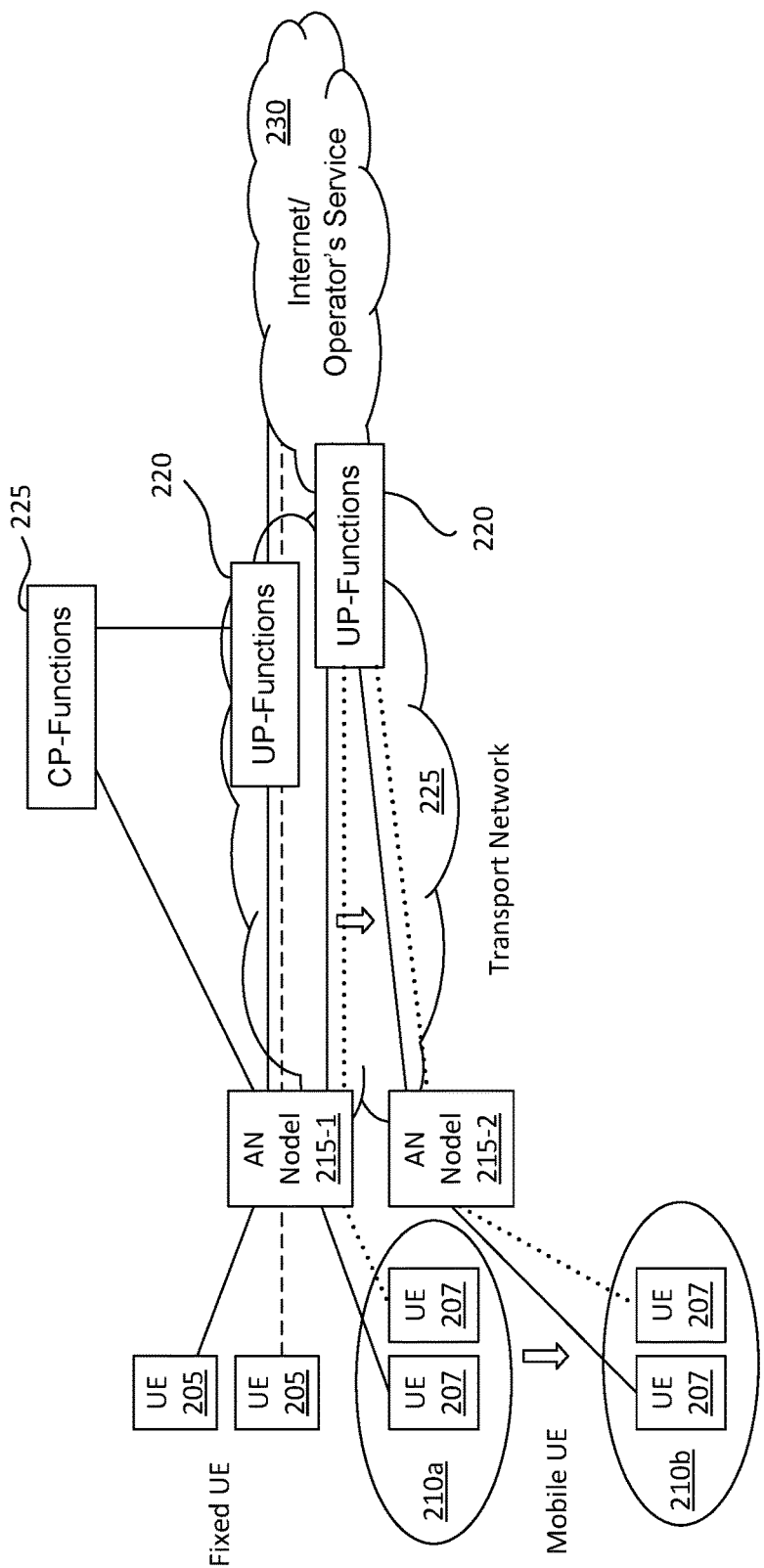
FIG. 2 illustrates a portion of a wireless communication network in which fixed UEs and mobile UEs connect to the network via access network (AN) nodes, in accordance with the prior art.

FIG. 2 illustrates a portion of a wireless communication network as described in Section 6.4.11 of TR 23.799 in which fixed UEs 205 and mobile UEs 207 connect to the network via AN nodes 215-1 215-2. The mobile UEs are shown in an initial first location 210a and in a subsequent a second location 210b. The AN nodes connect to UP functions 220 via a transport network 225. The AN nodes 215-1 215-2 and the UP-Functions 220 are controlled by corresponding control plane (CP) functions 225. When the mobile UE 207 moves from the first location 210a to the second location 210b, the CP functions 225 are operative to re-direct the UP-functions 220 from the first Node 215-1 to the second AN Node 215-2. It is noted that multiple UP functions 220 can be provided and communicatively coupled, for example via an N9 interface. UP functions 220 may perform operations such as, but not limited to, packet gateway or serving gateway operations.

For example, a UE may be mounted in a vehicle and configured to report its location or other information to an application server for fleet management. An aggregate node-level tunnel between the currently connected access node and the appropriate UP function may be used to support this communication.

Embodiments of the present invention provide a method and system for supporting customer service delivery over a network. Embodiments of the present invention provide a method and apparatus for implementing, in a 5G wireless communication network, data transmission procedures for use with node-level tunnel protocols. This method and system employs network slices to provide UEs connecting to the network with access to the customer services. The network slice concept has been accepted in wireless telecommunication industry. As used herein, a "slice" is a set of network resources (cloud resources, physical connection resources, wireless spectrum resources, telecommunication equipment resources (access cells)), which has been allocated to a service or a set of services. The created slice can also be referred to as a virtual network (VN), and the terms are used interchangeably herein. As used herein, the term "service" is used to refer to an entity that is providing a centralized point to receive or transmit data traffic to connected UEs. By way of example, a business customer may offer delivery of data traffic (such as on-demand video or audio) to subscribing UE. In operation a plurality of UE will seek to connect to the business customer's server(s) to download the data traffic.

Embodiments of the present invention facilitate slice-aware service traffic delivery, or "Hop-On" traffic delivery. The "Hop-On" traffic delivery system and method can be compared to a traveler that hops-on a tourist bus having a pre-defined sightseeing route. The traveler can choose to join or leave the tourist bus without any additional set-up or coordination after the initial access to the bus. In various embodiments of the present invention involving VN traffic delivery, access to a service does not require per-UE per-session establishment, and does not require end-to-end connection setup between the UE and the service provider. Various embodiments avoid on-demand session setup as the session is effectively "pre-existing" as a VN slice established on the network. The VN slice is supported by a pre-defined VN topology configured on the network. The UE only needs to negotiate its entry or exit from the slice which may occur at a localized level. The connection between the slice access point and the service provider is established and maintained by the control functions managing the slice.

Such a Hop-On scheme facilitates management of service delivery on a per-service basis over a VN tunnel. In some embodiments, all physical network nodes treat all traffic of one service the same and there is no requirement to differentiate between UEs, except in the access link. All per-UE/per-session setup related overhead (remote configuration) and latency is removed and there is no per UE "session connection context" required in the network.

In some embodiments, after a UE registers to the network and UP slice(s), the only required UE-specific context required is the UE's location (i.e., a current anchor point of this UE—at a VN node), activity status and registered UP slice(s) which allow Hop-On and access to customer services as and when required.

Embodiments of the present invention provide for relatively simple and efficient signaling procedures for supporting one or a combination of: different types of UEs; and different types of services. In particular, simplified signaling procedures for attaching a UE to a network, performing session establishment, and transmitting one or both of: uplink data and; downlink data are provided.

According to embodiments of the present invention, node-level tunnels may be used to carry at least two levels of traffic. For example, requests may be carried in the same tunnel as the service. More particularly, requests for data and transfers of data made in response to such requests may both be transmitted via the same tunnel. The tunnel may be pre-configured so that UE requests are carried over the pre-configured tunnel.

In various embodiments, different types of traffic, such as traffic carrying video or voice data, are treated differently in each tunnel.

Embodiments of the present invention provide a method and apparatus which establishes a common tunnel for some types of traffic (instead of using a common tunnel for all traffic) between a pair of network nodes or network functions (NFs). In some embodiments, a common tunnel for some types of traffic may be established between each pair of network nodes or network functions. In addition, the policy function can apply constraints on the common node-level tunnel. For example, the node-level tunnel can be used for a specific slice, or a group of users, or a particular traffic types, or specific services.

As described in TR 23.799, when a UE attaches to the network or sets up a PDU session to one DN, the control plane (CP) authorization function (CP-AU) authorizes the UE type (e.g., a type of fixed wireless UE) and identifies whether AN node level tunnel applies. If so, the CP determines the corresponding tunnel for the PDU session based on information such as DN name, the tunnel end point information (e.g., UP IP addresses) or the AN node ID provided by the AN.

Now, according to embodiments of the present invention, the provided UE context is stored in memory (i.e. storage) at the AN, or stored in a remote memory location accessible to the AN. When the UE initiates a subsequent uplink transmission, the AN is configured to verify the UE context and forward the UE data to the pre-configured node-level tunnel. When the context is stored in a remote memory location accessible to the AN, the remote memory may be part of a distributed AN, or a dedicated data storage device, such as a device in a datacenter, which is consistently associated with and communicatively coupled to the AN.

Figure 3:
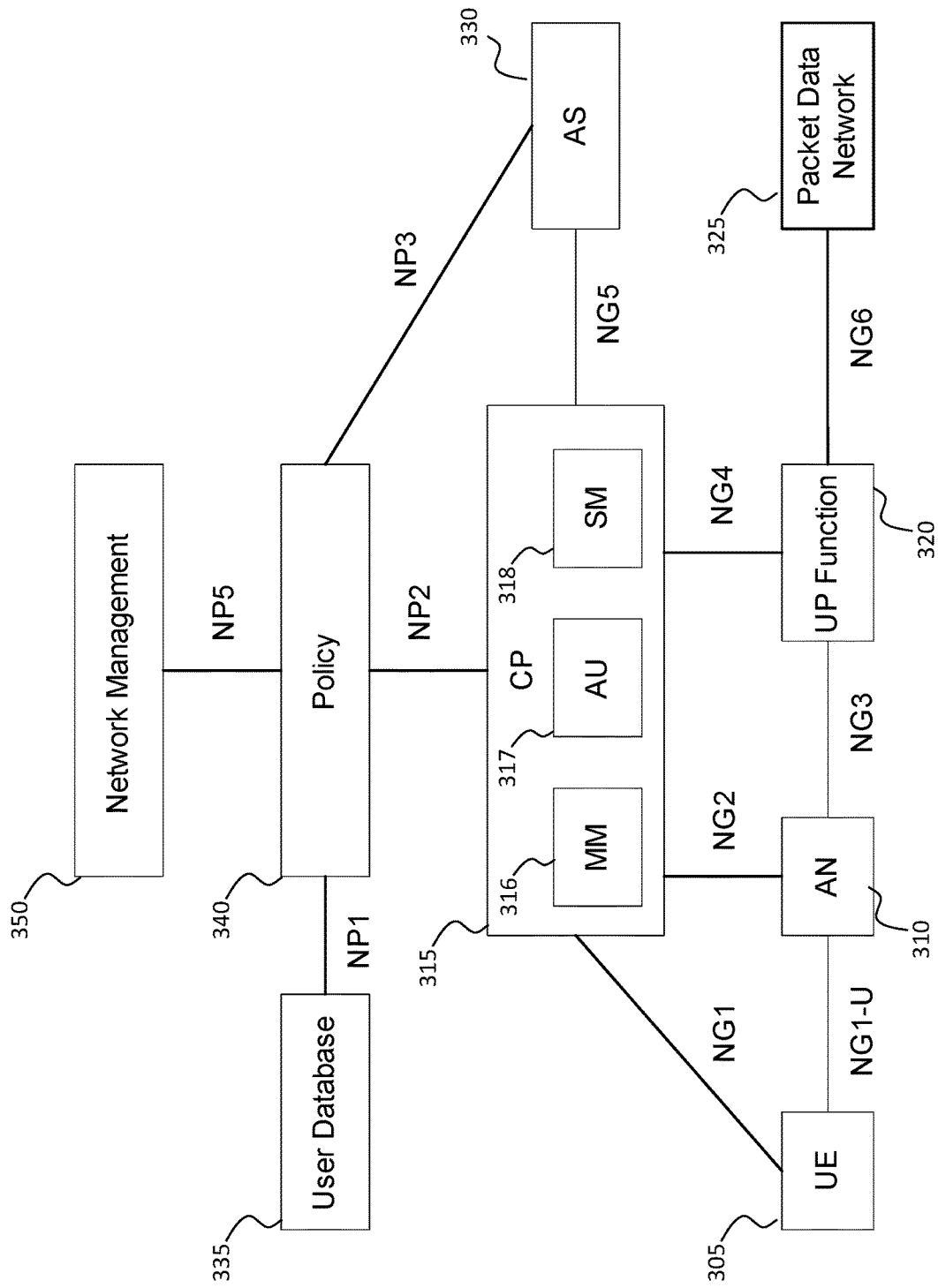
FIG. 3 illustrates a network architecture in accordance with an embodiment of the present invention.

FIG. 3 illustrates a network architecture provided in accordance with an embodiment of the present invention. Communication interfaces between entities are provided by next-generation interfaces which are labeled NGx, with x being a variable label value as shown in the figure. Communication interfaces between the policy function and other entities are provided by next-generation interfaces which are labeled NPx, with x also being a variable label value as shown in the figure. A particular notable aspect of the architecture is the presence of an interface NP5 between the policy function 340 and the network management function 350. This configuration allows for network management interfacing through policy functions. The policy function 340 can thereby be used to configure the node-level tunnel.

For completeness of description, FIG. 3 further illustrates the following. A UE 305 is coupled to an access network (AN) 310 via an interface NG1-U and to a control plane (CP) 315 via an interface NG1. The CP 315 includes a mobility management function (MM) 317, an authorization function (AU) 318, and a session management function (SM) 319. The AN 310 is coupled to the CP via an interface NG2. A user plane (UP) function (UPF) 320 (such as a gateway) is coupled to the AN 310 via an interface NG3 and to the CP 315 via an interface NG4. A packet data network 325 is coupled to the UP function 320 via an interface NG6. The policy function 340 is coupled to the CP 315 via an interface NP2, to an application server (AS) 330 via an interface NP3, and to a user database 335 via an interface NP1. The AS 330 is coupled to the CP 315 via an interface NG5.

In some embodiments, the CP function 315 (including the CP-MM 316, CP-AU 317 and CP-SM 318) can be communicatively coupled with other functions or resources in the control plane, such as the User Database 335. A service-based interface, for example as described in the 3GPP document TS 23.501 "System Architecture for 5G System", version 1.2.0, Jul. 26, 2017, or 3GPP TS 23.502 "Procedures for the 5G system", version 0.6.0, Aug. 17, 2017, may be used to facilitate this communication.

In some embodiments, when creating a node-level tunnel, the CP-SM 318 may obtain UE information from the user database 335. The UE information may include pre-configured network slice information, for example. The information may be used in establishing a UE context at the AN 310. Based on the network slice information sent from the UE 305 (e.g. in an attach or registration request), the AN 310 can assign the UE 305 to a particular node-level tunnel.

Embodiments of the present invention provide for three levels of traffic management for node-level tunnels. Notably, the below-described node-level management routine is provided according to embodiments of the present invention to allow for per-node level tunnel policy control.

At a first level, network slice level management is provided. Network slice level management may be provided by a network management (NM) function. The NM function provides initial network resources to network slices. The NM function also monitors the resources usage of network slices and adjusts the network resource assignment to network slices on a long-term basis (for example on the time scale of weeks or months). The NM function may provide an indication of network resource assignments to a policy function.

At the second level, the node-level tunnel is managed by a policy function. For given network resources assigned by the NM function, the policy function is configured to provide policy decision data directed toward dynamically distributing traffic flows to node-level tunnels and to different radio access technologies (RATs) (and optionally different radio access networks) for different times, such as different times of the day. This second level is not described in the current version of TR 23.799 and allows for a policy function to manage traffic on a per node-level tunnel basis.

At the third level, PDU-level and UE-level management is performed by a control plane session management (CP-SM) function. The CP-SM assigns some or all of individual flows; sessions; and UEs to node-level tunnels according to the policy set by the policy function. The CP-SM can establish node-level tunnels based on a policy obtained from the Policy Function before any new session requests from UEs arrive.

Embodiments of the present invention therefore provide for a session management function, residing in the control plane, which receives policy information from a policy function and establishes and configures node-level tunnels based on the received policy information, prior to the reception (at the session management function) of requests from UEs, such as new session requests or other requests that are accommodated using node-level tunnels. The session management function may configure the node-level tunnels based on a variety of information from other nodes, such as logical network configuration information received from the network management function. This is explained in more detail below.

Referring again to FIG. 3, the policy function 340 receives information from various network functions (via various next-generation interfaces), and uses the received information to make policy decisions for node-level tunnels.

Policy decisions can be computationally generated according to a predetermined set of rules provided to the policy function. Examples of received information from various nodes or functions are described as follows.

The policy function may receive some or all of the following information from AN nodes via a path which includes the NG2 interface and the NP2 interface: real-time traffic load reports; and optionally congestion levels of certain traffic flows which requires special treatment, for example to support high peak rate, or high average rate, or very short packet delay requirements. The traffic load reports can be indicative of total traffic load of all flows, or traffic load due to certain services, such as video streaming flows from a content provider.

The policy function may receive the following information from UP functions via a path which includes the NG4 interface and the NP2 interface (where NPx interfaces are as illustrated in FIG. 3): real-time traffic load reports; congestion level of certain traffic flows which requires special treatment, for example to support high peak rate, or high average rate, or very short packet delay requirements; and processing load of UP functions (such as computing and storage resource usages). The traffic load reports can be indicative of total traffic load of all flows, or traffic load due to flows of certain services, such as video streaming flows from a content provider.

The policy function may receive the following information from the network management function over the NP5 interface: logical network configuration, including details of capacity of logical links between network functions (AN nodes and UP nodes); mutual dependency of logical link capacity; processing capacity of network functions; and transmission cost over logical links and network nodes. The policy function may also receive, from the network management function (over the NP5 interface), information regarding one or both of: the logical network topology; and the physical network topology. The policy function may be configured to optimize policies for traffic steering between a UP function and different AN nodes of different RATs (e.g. from the UP function to the AN nodes), QoS setting for data flows, and congestion management for flows and network nodes in the network based on this information.

The User Database and CP-SM can also have indications of one or both of: a logical network configuration; and a physical network configuration, which is sent from the Network Management function and received by the User Database, the CP-SM, or both. In this case, the Policy function can retrieve the logical network configuration from User Database or CP-SM function via NP1 or NP2, respectively. The policy function may receive the following information from the AS via the NP3 interface: device types; geographical distribution of devices; traffic characteristics (for example data rate and distribution of session arrival time); and QoS requirements of traffic (for example average bit rate, maximum bit rate, packet delay requirements).

In some embodiments, network data may be stored in the network and provided to one or more of: the Policy function, the AN node, and the CP-SM. The network data can be stored in the User Database. The network data can be stored in a Unique Data Management (UDM) function, which stores some or all of: user subscription data, policy data (e.g. indicative of QoS policies and charging policies), the network data and session related information (e.g. the mapping between IMSI and IP address of the UE). The UDM function can be part of the User Database.

The policy function may receive the following information from the User Database via the NP1 interface: the actual number of attached UE to an AN node. This information may be different from the data provided by the AS function, which is initially provided based on an estimate.

According to embodiments of the present invention, the policy function is configured to perform policy optimization for traffic routing between AN nodes and UP functions for load balancing among UP function, traffic steering among radio access networks, and QoS setting (for example rate limit of each node-level tunnel)—i.e. policy updates. In addition, the policy function is configured to inform the CP-SM function about the policy decisions made. Four examples of such policy decisions are given below.

A first example policy decision is the maximum bit rate of node-level tunnels. Depending on the fair resource usage policy, the maximum bit rate of node-level tunnels can be set. If the maximum bit rate has been reached, some packets of certain flows can be dropped.

A second example policy decision is a designation between the types of devices which are to be served and the node-level tunnels used to serve the types of devices. For example, a group of electricity-metering IoT devices served by a specific AN node may be served by a specific node-level tunnel. Another example is designating smart phones to be served by another specific node-level tunnel.

A third example policy decision is an indication of types of services to be served by particular node-level tunnels. For example, all traffic of sessions connected to YouTube servers, or other servers offering a particular service or type of service, may be carried by a designated node-level tunnel. As another example, all data sessions sponsored by a third party may be carried over another designated node-level tunnel.

A fourth example policy decision is an indication of the maximum number of UEs having traffic carried by a node-level tunnel. For example, depending on the processing capability of network functions, the number of sessions or the number of UEs, can be set to a limit. In a further example, depending on the processing capability of network functions, the maximum number of sessions or the maximum number of UEs, can be set to a predetermined limit.

Embodiments of the present invention are configured to perform congestion handling by a mechanism in which packets of some sessions are randomly or selectively dropped. For random packet dropping, packets may be dropped based on the QoS information in their encapsulation header. For selective packet dropping, packets may be dropped based on the QoS information in the encapsulation header and optionally the QoS for the UE session corresponding to that PDU session. In some aspects, per-UE packet dropping may be selectively applied by identifying the UE session from an identity of the PDU session. For example, the PDU session of an IP connection may be identified by an IP header in the PDU header information, such as IP addresses of source and destination, port numbers of source and destination, and traffic type.

Furthermore, in some embodiments, the random or selective packet drop can be applied in particular at the entry of the node-level tunnel. This may assist in preventing congestion at either the source or the destination tunnel end point. In this case an identification of packet-to-user correspondence may be made at the tunnel entry. This is in contrast to dropping the packets at the congestion bottleneck. When a packet is to be dropped, dropping it as early as possible can mitigate network congestion. In some embodiments, congestion handling operations such as packet dropping decisions can be performed at the tunnel destination (e.g. access node in the case of a downlink tunnel) but the packet may be dropped at the tunnel entrance (e.g. UPF).

Furthermore, in some embodiments, the network nodes handling congestion control or experiencing or enforcing a maximum bit rate are configured to forward incoming packets to another node-level tunnel. The other node-level tunnel can be selected as one that is carrying less traffic, or one for which the destination node is not congested or less congested.

Embodiments of the present invention provide a UE attachment and session establishment method and apparatus. The method is described in detail below, while the apparatus comprises one or more network nodes or functions configured in a particular manner to perform the described method operations. In some embodiments, UE attachment and session establishment can both be performed in a combined procedure, to limit signaling overhead.

When a UE is to connect to the network, the UE initiates a network attach procedure. After the attachment procedure, the UE may transmit a new session request. Embodiments of the present invention provide for a combined network attach procedure and session establishment procedure, in which the two procedures are combined together. This simplifies the signaling requirements for certain types of UEs and certain types of services.

Figure 4:
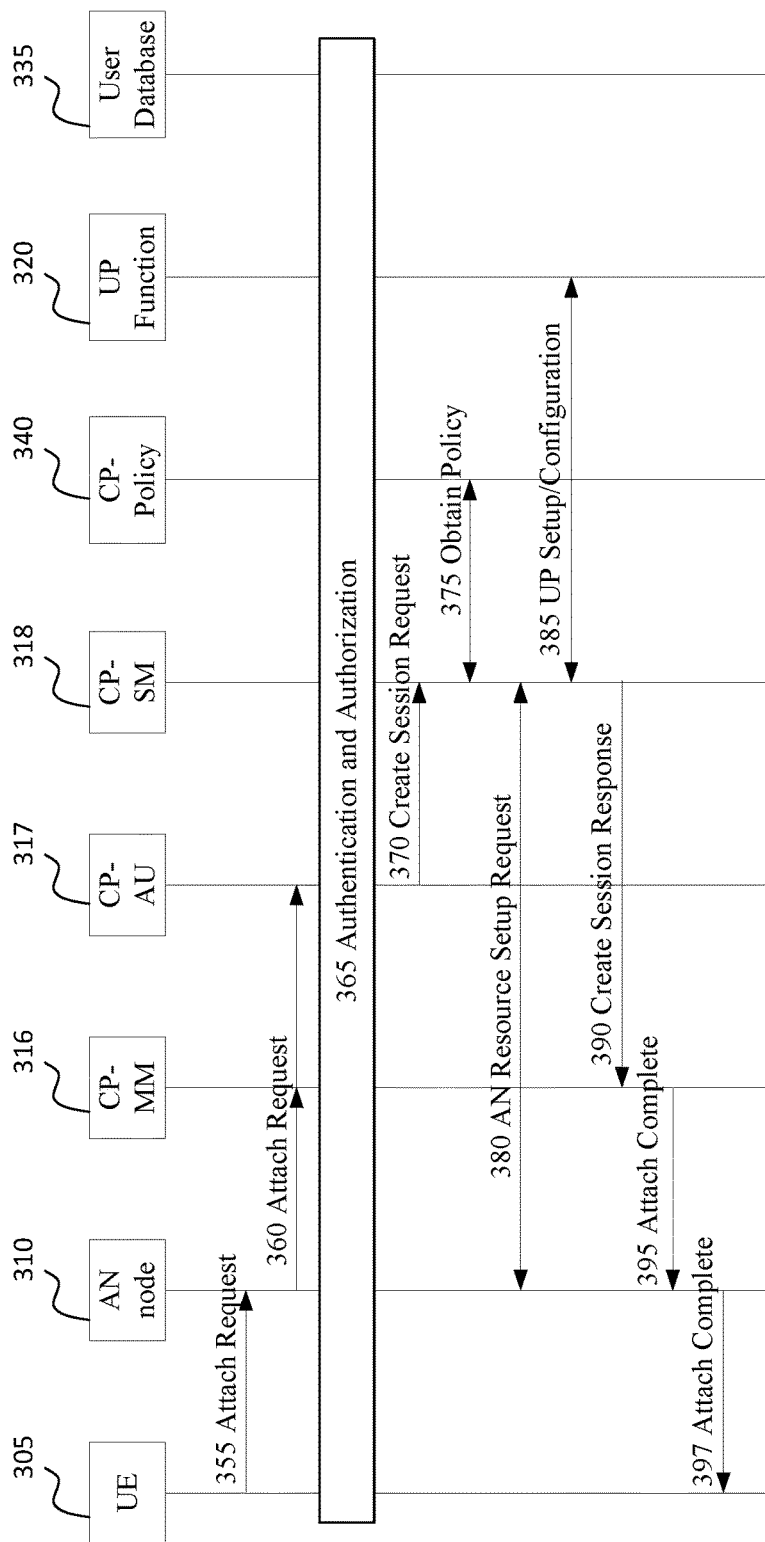
FIG. 4 illustrates a general UE attach and session establishment procedure, for attaching a UE to the network by an AN node-level tunnel, in accordance with an embodiment of the present invention.

FIG. 4 illustrates a general UE network attachment and session establishment procedure, for attaching a UE to the network by an AN node-level tunnel, according to embodiments of the present invention. In an alternative embodiment, the procedure can be described as processing of a UE request to send UL data or receive DL data. This UE request may combine Attach and Session Establishment procedures. The procedure is described as follows.

The UE 305 transmits an attach request message 355 to the AN node. The UE type is indicated in the signalling associated with the attach request. In this respect, the signalling is comparable to a radio resource control (RRC) message.

The AN node 310 may recognize the UE type and incorporate node-level tunnel selection assistance information into the attach request message. Such assistance information may include the tunnel end point IP addresses or AN node ID, for example. The AN node 310 then transmits the (possibly modified) attach request message 360 to the CP-MM function 316. The CP-MM 316 communicates with the CP-AU function 317 to handle authentication operations related to the UE attachment request.

Next, an authentication operation 365 is performed. As part of the authentication operation 365, the CP-AU 317 verifies the UE and user subscription data in the user database, such as the UE type, in order to authenticate the UE 305. The CP-AU function 317 and UE may perform a mutual authentication operation. If the mutual authentication is successful, the CP-AU 317 can assign a globally unique temporary identifier (GUTI) to the UE 305. After that, CP-AU 317 verifies the session request based on user subscription data. For example, in the case of smart phone devices, the session request can be a request for broadband data transmission. If the user subscription includes the broadband data transmission service, the UE 305 will be authorized to use this service.

Next, following successful authentication and authorization, the CP-AU 317 transmits a create session request message 370 to the CP-SM 318. This step can be omitted if the CP-AU 317 and CP-SM 318 functions are combined into a single function. In another embodiment, instead of the CP-AU 317 sending the Create Session Request message 370, the CP-MM 316 may send the Create Session Request message (i.e. a message similar to message 370) to the CP-SM 318. This may still occur after step 365.

Next, the CP-SM 318 obtains 375 operator policy information from the CP-policy function 340. The operator policy information is used for UE session setup, such as quality of service (QoS) and charging policies.

Next, the CP-SM 318 selects the UP function 320 based on available information such as the DN name, tunnel selection assistance information provided by the AN 310, and operator policy information. The CP-SM 318 assigns a UE session ID (such as an IP address) corresponding to the UP function 320. The CP-SM 318 then transmits a resource request setup message 380 to the AN 310, in order to request the AN 310 to setup resources for the session. This message includes uplink and downlink node-level tunnels associated with the UE session ID, which may be an IP address, for example. In a further embodiment this message includes indications of one or both of uplink node-level tunnels and downlink node-level tunnels, the tunnels to be associated with the UE session ID, which may be an IP address, for example.

Next, the CP-SM function 318 performs a setup/configuration operation 385 in association with the UP function 320 in order to set up the user plane. This may include providing notification of the assigned UE session ID (such as IP address), indicating the tunnel used to the AN 320, and indicating the corresponding traffic handling policy for this session. If the per node-level tunnel is selected, the CP-SM function 318 may reconfigure the tunnel parameters such as but not necessarily limited to the maximum bit rate.

In various embodiments, the CP-SM 318 and UP 320 functions store UP UE context information individually. The UP UE context includes a mapping of the UE session ID (e.g. the UE's IP address) and its associated uplink and downlink tunnels, traffic handling policy for uplink and downlink sessions, and charging information.

It is noted that, in some embodiments, the UP UE context can be removed based on a trigger set by the policy function. For example, after a predetermined time has elapsed in which no uplink or downlink PDUs are received at the UP function, or upon receipt of an explicit message from the CP-SM 318 instructing removal of the UE context, the UP UE context can be removed.

Next, the CP-SM 318 transmits a create session response message 390 to the CP-MM 316. The message 390 indicates the UE session ID (e.g. IP address). If the per node-level tunnel is selected, the message 390 indicates the assigned node-level tunnel for uplink and downlink (if downlink traffic is required) traffic. The message 390 may also indicate the traffic handling policy. The message 390 may also indicate a particular method to be used for updating the UE context at the AN node 310 (or possibly at the UP function 320), in the case of UE mobility.

Next, the CP-MM 316 transmits an attach complete message 395 to the AN node. The message 395 indicates the UE session ID (e.g. IP address), and the content of message 390, which assigned node-level tunnels for uplink and downlink (if downlink traffic is required) traffic, and the associated traffic handling policy for uplink and downlink. The message 395 also indicates the method to be used for updating the UE context at the AN node 310 (or possibly at the UP function 320), in the case of UE mobility, i.e. when the UE is mobile and has possibly moved to a different location served by another AN.

Next, the AN node 310 transmits an attach complete message 397 to the UE 305. The attach complete message 397 indicates the radio resource configuration for use by UE 305 for transmitting data in the uplink and for receiving data in the downlink, if downlink transmission is required.

The AN node 310 is configured to store AN UE context data based on information carried in the received CP-MM attach complete message 395. The AN UE context may include the UE ID, indications of pre-configured tunnels to be used for uplink and downlink traffic (if downlink traffic is required), and an indication of a traffic handling policy, such as QoS and charging, to be used.

It is noted that, in some embodiments, the AN node 310 can remove the stored AN UE context based on a trigger set by the policy function. The trigger may be a timeout trigger, which initiates context removal after a predetermined time has elapsed in which no packets are transmitted from or to the UE. The trigger may be a UE mobility event indicative that the UE 305 is no longer being served by the AN node 310. The trigger may be a CP-SM 318 function instruction to remove the UE context.

In view of the above, it is noted that certain embodiments comprise generating selection assistance information by an access node, based at least partially on content of an attach request. A UE context request message can include the selection information. Furthermore, a pre-configured node-level tunnel for use by the UE can be selected based at least partially on the selection assistance information.

Figure 5:
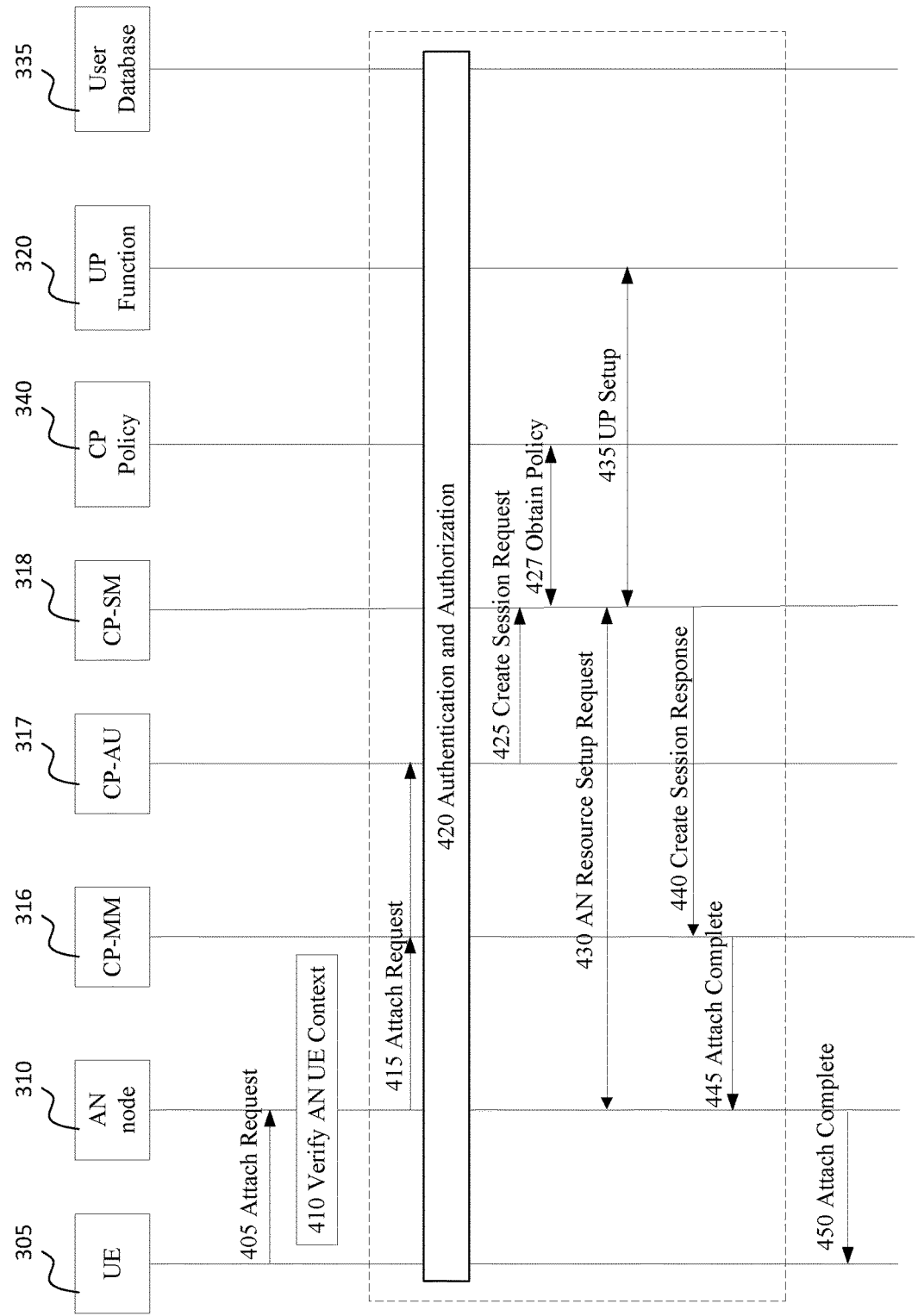
FIG. 5 illustrates a general UE attach and session establishment procedure, for attaching a UE to the network by an AN node-level tunnel, in accordance with another embodiment of the present invention.

FIG. 5 illustrates a UE attachment and session establishment procedure for attaching a UE 305 to the network by an AN node-level tunnel supporting connection-less transmission, according to embodiments of the present invention. Alternatively, the procedure can be described as processing of a UE request to send UL data or receive DL data. This UE request may combine Attach and Session Establishment procedures. The procedure of FIG. 4 can be used to support a new session request. For infrequent data transmission such as traffic of Internet of Things (IoT) devices, the procedure of FIG. 4 can be modified to reduce signalling requirements. The AN node and UP function can store UE context after the UE 305 initiates the first attach request. When the UE 305 initiates subsequent infrequent data transmission requests, the AN 310 will verify the UE context and forward the UE data to the pre-configured node-level tunnel.

Referring to FIG. 5, the UE 305 transmits an attach request 405 to the AN node 310. The attach request 405 includes destination PDN (packet data network) information identifying the destination PDN for the packets to be sent by that UE. The AN node 310 further utilises UE type information, which may either be included in the attach request 405, or may be available to the AN node 310 based upon a UE identifier associated with the attach request 405.

Next, the AN node 310 verifies 410 whether UE context corresponding to that UE/UE type and destination service (i.e. destination PDN) identified in the attach request 405 is available. The UE context may be verified, for instance, by matching the destination PDN information and UE identifier/UE type to UE context information maintained in a data store accessible to the AN node 310. If the UE context exists, then the VN or session has already been established for that UE/UE type and destination service. Accordingly, operations 415 to 445 may be skipped, and the AN node 310 can transmit an attach complete message 450 to the UE 305 because it has the necessary information to handle traffic corresponding to that attach request 405. The UE context may include, for instance, the UE session ID/UE type, indications of pre-configured tunnels for uplink and downlink traffic (if downlink traffic is required), and a traffic handling policy. The AN node 310 may then handle all received traffic between the UE 305 and the PDN 325 based upon the UE context.

Verifying 410 the UE context information may comprise obtaining the UE context information based on content of the attach request. The UE context information may be obtained from a storage available to the access node, provided that the UE context information is available from the storage (due to previous storage therein). The storage may be a memory device, such as an electronic or volatile or non-volatile memory or mass storage device. In some embodiments, the storage (e.g. memory) is integrated into the access node.

In some embodiments, the UE context in the AN 310 comprises at least the following information: one or both of UE ID (IMSI (International Mobile Subscriber Identity) and GUTI (Globally Unique Temporary ID)), UE session ID (e.g. one or both of an IP address and a MAC address of the UE), UE device type, list of destination PDN, and a list of uplink and downlink node-level tunnel pairs associated with PDNs. The UE context may further include, for instance, QoS information (such as packet delay constraint and data rate) specific to that UE or attachment request, charging information, and security information (such as encryption keys for air-interface packet encryption in uplink and downlink).

Next, and when operations 415 to 445 are not skipped, an attach request message 415 is transmitted by the AN node 310 to the CP (e.g. to the CP-AU 317) for at least one of authentication and resource setup. In some aspects authentication may not be required either based on UE context, or the service to which the attach request relates. In the aspects, either the AN node 310 or the CP (e.g. CP-AU 317) may be operative to determine whether the attach request requires authentication.

The AN node 310 may recognize the UE type and incorporate the node-level tunnel selection assistance information (i.e., tunnel end point IP addresses, AN node ID, current traffic load over these tunnels) together with the attach request message 415 transmitted to the CP-MM function 316. The CP-MM 316 communicates with the CP-AU function 317 to handle the UE attachment authentication if relevant to the attachment request.

Next, if required, an authentication operation 420 is performed in which the CP-AU 317 verifies with the user database information such as UE type and allowed PDN connections, in order to authenticate the UE 305. The CP-AU function 317 and UE 305 perform a mutual authentication operation. If the mutual authentication is successful, the CP-AU 317 or CP-MM can assign a GUTI to the UE 305. After that, the CP-AU 317 verifies the session request based on user subscription data. For example, in the case of IoT devices, the session request can be a request for infrequent data transmission. If the user subscription includes an appropriate service supporting infrequent data transmission, the UE 305 will be authorized to use this service.

Next, if the UE 305 is allowed to send data, the CP-AU function 317 transmits a Create Session Request message 425 to the CP-SM function 318. If the CP-AU and CP-SM functions 317, 318 are integrated in a single unit, for example in a single network function implemented by software, message 425 can be omitted. The CP-SM function 318 may create a session in response to the message 425.

In another embodiment, instead of the CP-AU 317 sending the Create Session Request message 425, the CP-MM 316 may send the Create Session Request message (i.e. a message similar to message 425) to the CP-SM 318 after step 420.

Next, the CP-SM function 318 obtains operator policy information 427 via interaction with the CP policy function 340. The operator policy information obtained from the CP policy function 340 is used for UE session setup.

Next, the CP-SM function 318 selects the UP function 320 (from among a plurality of potential UP functions) based on the information such as the PDN Name, tunnel selection assistance information provided by AN, and operator policy. The CP-SM function 318 assigns the UE 305 one or multiple IP addresses or one or multiple IP prefixes corresponding to the UP function 210. The CP-SM function 318 then requests the AN 310 to set up resources for the session via an AN resource setup request message 430. This message also includes uplink and downlink node-level tunnels associated with the UE ID (e.g. IP address or other UE identifier such as GUTI).

Next, the CP-SM function 318 sets up 435 the user plane (e.g. the user plane interface) with the UP function 320. This may include notifying the UP function 320 of the assigned UE session ID (such as an assigned IP address), indicating the tunnels connected to the AN 310 in both uplink and downlink directions, and indicating the corresponding traffic handling policy for the session (such as QoS policy and profile, charging policy).

A tunnel ID can be assigned in step 435, corresponding to a tunnel to be used in communication between the UE 305 and the UP function 320. The tunnel can be a pre-existing, pre-configured shared tunnel used by plural UEs, for example a pre-configured node-level tunnel. The tunnel may be one of several node-level tunnels having an endpoint at the UP function. The tunnel may be shared by a group of UEs defined by a predetermined characteristic and consisting of less than all UEs. The tunnel may be dedicated for use in providing a particular group of services, consisting of less than all services available. In various embodiments of the present invention, the network can assign a UE to an existing shared tunnel, and provide a shared tunnel ID.

Depending on one or both of the UE type (such as the UE supporting Mobile Initiated Connection only (MICO)) and the traffic type, the downlink channel may not be required. In this case, only the uplink tunnel information is needed to be sent from the CP-SM function 318 to the UP function 320, and received by the UP function 320.

In various embodiments, the CP-SM and UP functions 318, 320 store relevant UP context information of the UE individually. The UP UE context includes a mapping of UE ID (such as SUPI, GUTI, IP address) and its associated uplink and downlink tunnels, traffic handling policy for uplink and downlink sessions, and charging information.

In some embodiments, the UP UE context can be removed based on a trigger set by the policy function. This may be performed for example after a timeout, when there are no uplink or downlink PDUs received at the UP function, or when receiving a message from the CP-SM 318 to remove UE context.

After the CP-SM 318 finishes setting the UP path, the CP-SM function 318 sends a Create Session Response message 440 to the CP-MM 316. An Attach Complete message is generated by the CP-MM 316, which contains the UE session ID (e.g. IP address). If step 430 was not performed the CP-SM 318 includes the assigned node-level tunnel for uplink and downlink (if required) traffics, and traffic handling policy in message 440. The Attach Complete message may also indicate a procedure to be used for updating the UE context at the UP function 320, in the case of UE mobility. The CP-MM 316 sends the Attach Complete message 445 to the AN node 310. The message 445 may include the content of message 440.

The AN node 310 then transmits the Attach Complete message 450 to the UE 305. The Attach Complete message 450 contains information on the radio resource configuration for use by the UE 305 in transmitting data in the uplink and in receiving data in the downlink (if the downlink is required).

If the UE context does not exist, the AN node 310 stores AN UE context based on information received from the CP-MM 316 Attach Complete message. The AN UE context includes the UE ID (IMSI and optionally GUTI), UE session ID (such as IP address), pre-configured tunnels for uplink and downlink traffic (if downlink traffic is required), and a traffic handling policy. In various embodiments, the AN node 310 keeps the AN UE context until the CP-MM 316 or CP-SM 318 sends a message to remove the AN UE context.

In various embodiments, the AN node 310 can remove AN UE context based on a trigger set by Policy Function and included in message 445. The trigger may be, for example: a timeout if there is no packet sent from or to the UE 305; a UE mobility event when (e.g. indicative that) the UE 305 is no longer served by this AN node; or a CP-SM function 318 instruction to remove the UE context.

Figure 6:
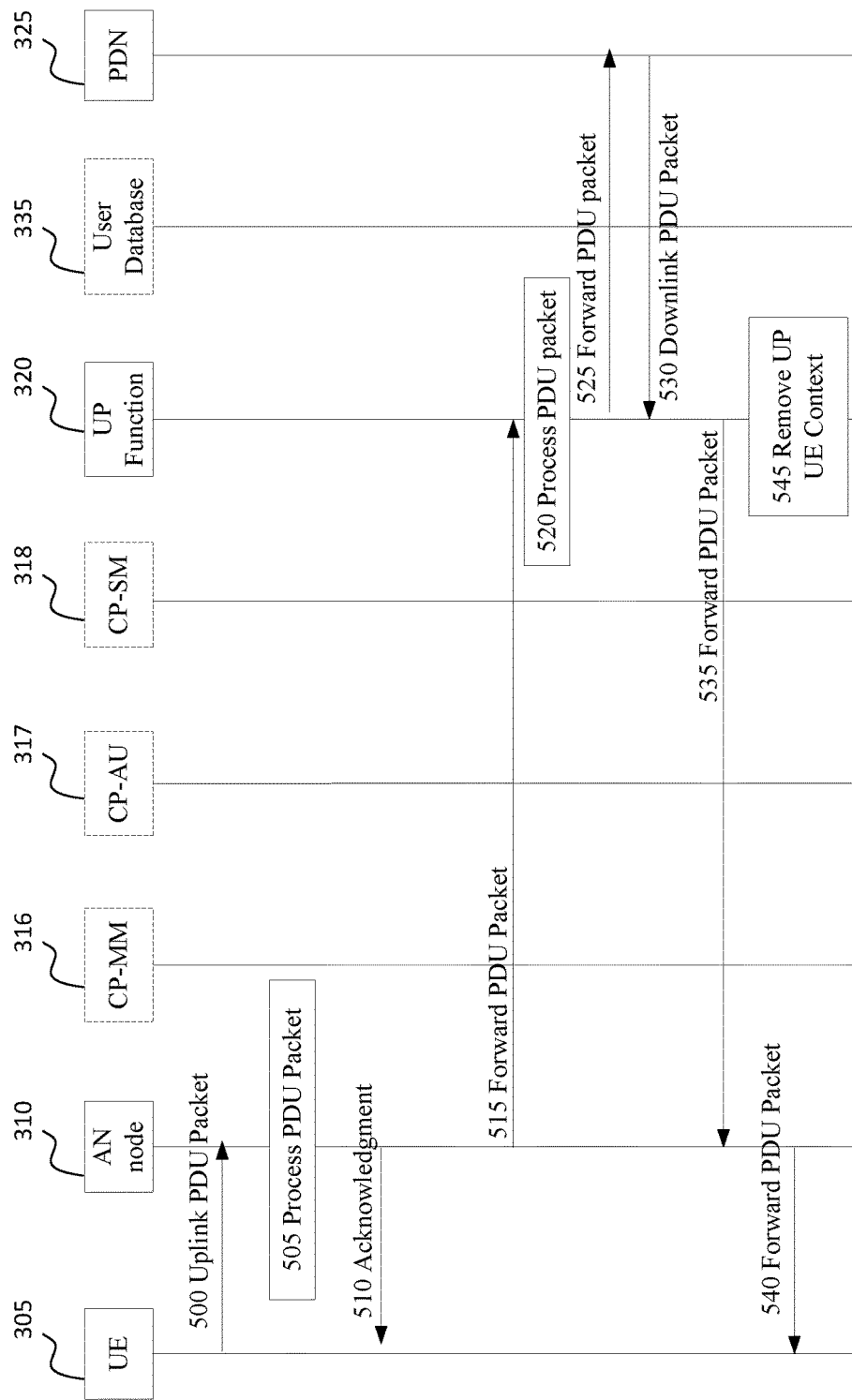
FIG. 6 illustrates a procedure for handling mobile-originated (MO) traffic, in accordance with an embodiment of the present invention.

FIG. 6 illustrates a procedure for handling mobile-originated (MO) traffic, in accordance with an embodiment of the present invention. The originating UE 305 is not necessarily mobile in the geographic sense. The procedure may be implemented by various network nodes and functions by configuration thereof.

First, the UE 305 transmits an uplink PDU packet 500 to the AN node 310 over the radio channel, for example as assigned in the attach complete message as described with respect to FIG. 4 (message 397) or FIG. 5 (message 450). The radio channel may correspond to the radio resource configuration carried in the attach complete message.

Next, the AN node 310 receives the uplink PDU packet and performs packet verification according to the stored AN UE context, thereby processing the packet 505. The AN node 310 may further process the packet to determine an appropriate shared tunnel to use, for example based on UE ID.

In some embodiments, and depending on one or both of the UE type and the NG1-U communication protocol, the AN node 310 may send a response message in response to receipt of the received PDU packet. If the UE 305 is allowed to transmit PDU packets, the AN node 310 transmits the acknowledgement 510 for the received PDU packet to the UE 305. Otherwise, an error code is sent to the UE. Furthermore, if the PDU packet cannot be decoded due to transmission error, the error code may be transmitted to trigger the UE to re-send the PDU packet.

In some embodiments, if the PDU packet is deemed to be valid, the AN node 310 encapsulates the PDU packet according to the node-level tunnel format and forwards 515 the encapsulated PDU packet to the UP function 320 over a pre-configured uplink tunnel. The pre-configured uplink tunnel may correspond to the established UE context, also referred to as UE context information. Encapsulation may be performed as part of packet processing 505, and may occur before or after acknowledgement 510.

Upon reception of PDU packet in the uplink, the UP function 320 processes 520 the packet according to the UP UE context and updates the UP UE context for charging purpose (for example, traffic counting) if the UP UE context is available. If the UP UE context is unavailable, UP function 320 contacts CP-SM function 318 to obtain the UE context. Processing 520 may comprise reading an extension header of the packet to determine UE ID.

In some cases, and for purposes of illustration, the UP function 320 is a gateway function (UP-GW) such as PDU Session Anchor (PSA) UPF. If, as determined by the policy enforcement function at the UP-GW, the PDU packet is allowed to be sent to PDN 325, the UP function 320 removes the tunnel encapsulation headers and forwards 525 the PDU packet to the PDN 325. (Based upon the UP UE context, the UP function 320 determines whether the PDU packet is authorized. If the PDU packet is an authorized PDU packet, the UP function removes the tunnel encapsulation header and forwards 525 the PDU packet to the PDN 325.)

In some embodiments, a shared tunnel may exist between the UP function and the PDN. In this case, a new encapsulation header may be attached to the PDU packet prior to forwarding.

Downlink PDU packets 530 can subsequently be received from the PDN 325. If the downlink PDU packets 530 (such as an acknowledgment message from the application server) are transmitted from the PDN 325, the UP function 320 (e.g. UP-GW) reads the UP UE context to determine a downlink tunnel for forwarding data towards the AN node 310 serving the UE and performs traffic handling.

The UP function 320 then forwards 535 the downlink PDU packet to the determined, pre-configured downlink tunnel.

Subsequently, the AN node 310 receives the downlink PDU packet via the tunnel, checks the AN UE context, and forwards 540 the PDU packet to the UE 305.

In various embodiments, the UP UE context can be removed 545 based on a trigger set by the policy function. For example, context can be removed after a timeout, when there are no uplink or downlink PDUs received at the UP function 320, or when receiving UE context message removal from CP SM 318.

It is noted that the UP function 320 may be a general UP processing function such as but not necessarily limited to a UP gateway (UP-GW). The UP gateway may be a serving gateway in the uplink or a packet gateway in the downlink.

Figure 7:
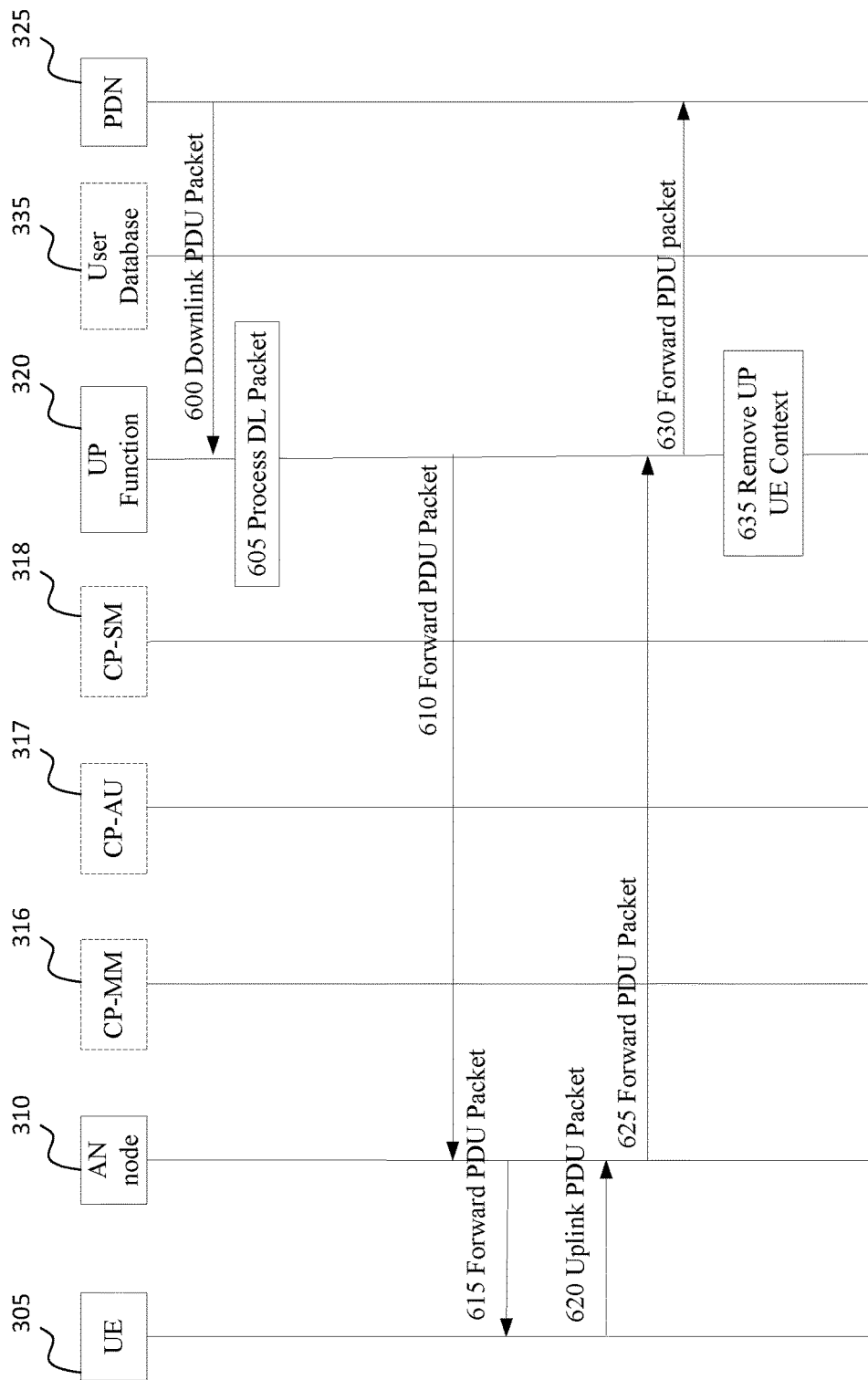
FIG. 7 illustrates a procedure for handling mobile-terminated (MT) traffic, in accordance with an embodiment of the present invention.

FIG. 7 illustrates a procedure for handling mobile-terminated (MT) traffic, in accordance with an embodiment of the present invention. The terminating UE is not necessarily mobile in the geographic sense. The procedure may be implemented by various network nodes and functions by configuration thereof.

Initially, the PDN transmits a downlink packet 600 to the UP function. Next, the UP function processes 605 the received PDU packet according to the stored UP UE context. If the UP UE context is unavailable, the UP function obtains the UE UP context from CP-SM. In some embodiments, the UP function encapsulates the PDU (DL) packet to the format of the downlink tunnel. The encapsulation may be performed as part of the processing 605 of the downlink packet.

Next, the UP function forwards 610 the encapsulated PDU packet to the AN node according to the UE context, which indicates which downlink tunnel towards the AN node serving UE.

The AN node refers to the AN UE context and tunnel header information to process the received PDU packet accordingly. The PDU packet is then forwarded 615 to the UE. The AN node may perform paging procedure to make UE radio receiver ready to receive the forwarded PDU packet.

If the UE transmits 620 an uplink PDU packet (for example an acknowledgment message in response to the received PDU packet), the AN node receives the uplink PDU packet and processes the PDU packet according to the AN UE context.

The AN node then encapsulates the PDU packet and forwards 625 the encapsulated PDU packet to the pre-configured node-level tunnel according to the AN UE context.

The UP function receives the uplink packet, and processes the uplink packet according to the stored UP UE context, including QoS policy and charging. If the packet is valid, the UP function removes the tunnel encapsulation header and forwards 630 the PDU packet to the PDN.

The UP UE context can optionally be removed 635 based on a trigger set by the policy function. For example, context can be removed after a timeout, when there are no uplink or downlink PDUs received at the UP function, or when receiving UE context message from CP SM 318.

Figure 8:
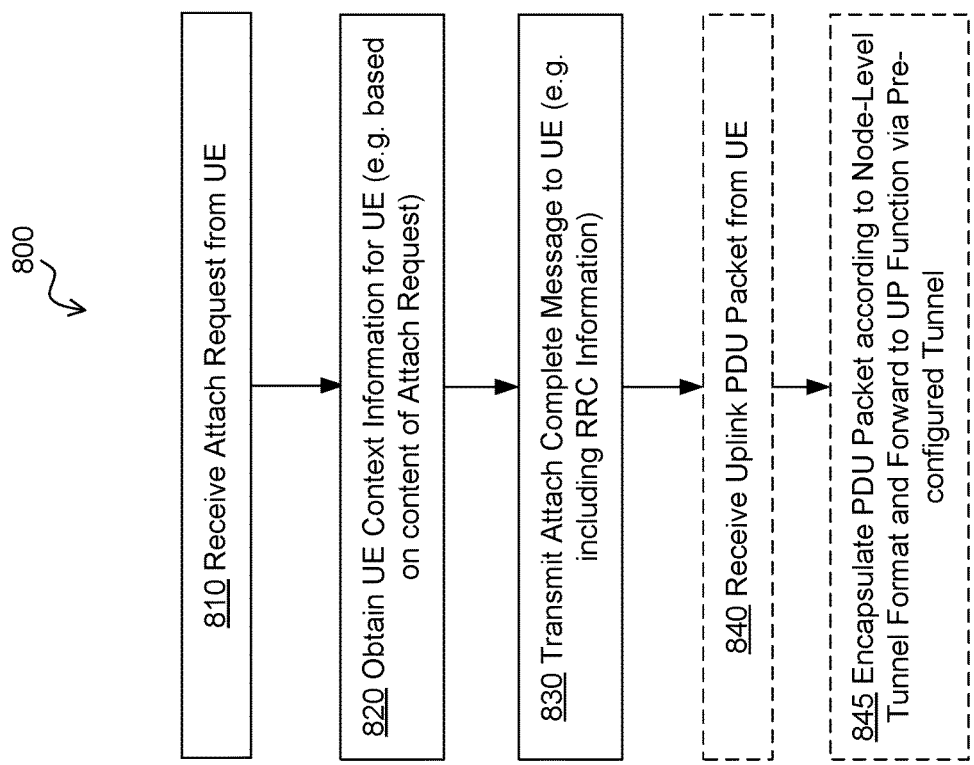
FIG. 8 illustrates a method for connecting (attaching) a UE to a network, according to an embodiment of the present invention.

In view of the above, FIG. 8 illustrates a method 800 for connecting a user equipment (UE) to a network. Alternatively, the method can be described as processing a UE request to send UL data. The method may be performed by a wireless access node of the network, such as a gNB. The method includes receiving 810 an attach request from the UE. The attach request may specify at least destination packet data network (PDN) information. The method further includes obtaining 820 UE context information corresponding to the UE. The obtaining operation can be based at least partially on content of the attach request. The method further includes transmitting 830 an attach complete message to the UE. The attach complete message may include radio resource configuration information for use by the UE when transmitting uplink data to the network, receiving downlink data from the network, or both. For example, use of the radio resource configuration (by the UE or wireless access node) may indicate that the uplink data is to be handled according to the UE context information and that the downlink data is for reception by the UE according to the UE context information.

In some embodiments, the method 800 may further comprise handling mobile-originated packet data traffic in a wireless communication network. This may include receiving 840, from a user equipment (UE), an uplink protocol data unit (PDU) packet at an access network node over a radio channel. This may further include encapsulating 845 the PDU packet according to a node-level tunnel format and forwarding the encapsulated PDU packet to a UPF via a pre-configured uplink tunnel. The packet may be processed, by the UPF, according to a user plane UE context associated with the packet. The UPF may also receive and forward downlink packets for the UE, including determining, based on the user plane UE context, a pre-configured downlink tunnel to use in forwarding the packet.

Aspects of the present invention are directed to methods and systems for using different types of tunnels used to carry data between two nodes in the network. Some embodiments indicate the tunnel type in the tunnel encapsulation header. Some embodiments allow for customization of the tunnel encapsulation header. For example, a compact tunnel encapsulation header can be used for some tunnel types, by not including header fields which are not needed for the type of tunnel utilized. Some embodiments can embed routing information in the tunnel encapsulation header.

According to some embodiments of the present invention, there is provided a method of packet transmission that includes identifying a tunnel type, out of a plurality of possible tunnel types, of one or more packets and processing the packets according to the identified tunnel type. The tunnel type may be identified in a tunnel encapsulation header, for example in the message type field thereof. The tunnel type may be identified via control plane signaling. Some tunnel types may indicate presence of a compact header, such as a compact encapsulation header omitting one or more fields present in headers of other tunnel types. Some tunnel types may allow for per-packet QoS handling, for example in the event of congestion. In some embodiments, a UPF performs the above method and further the UPF further receives user data and encapsulates the tunnel type in a tunnel encapsulation header.

Figure 9:
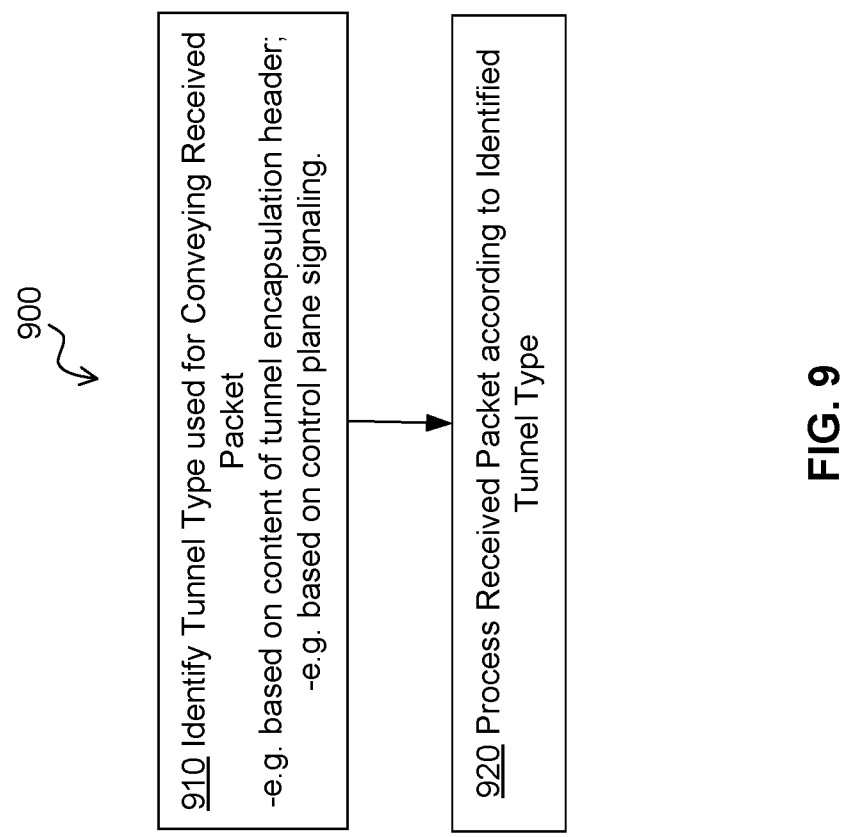
FIG. 9 illustrates operations for processing a packet received via a communication network, according to an embodiment of the present invention.

According to some embodiments, and with reference to FIG. 9, there is provided a method 900 (and associated apparatus) for processing a packet received via a communication network. Operations of the method and apparatus include identifying 910, from a plurality of tunnel types, a type of tunnel used for conveying the received packet. The identifying may be based on content of a tunnel encapsulation header of the packet. In some embodiments, the identifying may be performed based on content of a message type field belonging to the tunnel encapsulation header. The identifying may alternatively be based on control plane signaling. The operations further include processing 920 the received packet according to the identified type of tunnel.

Figure 10:
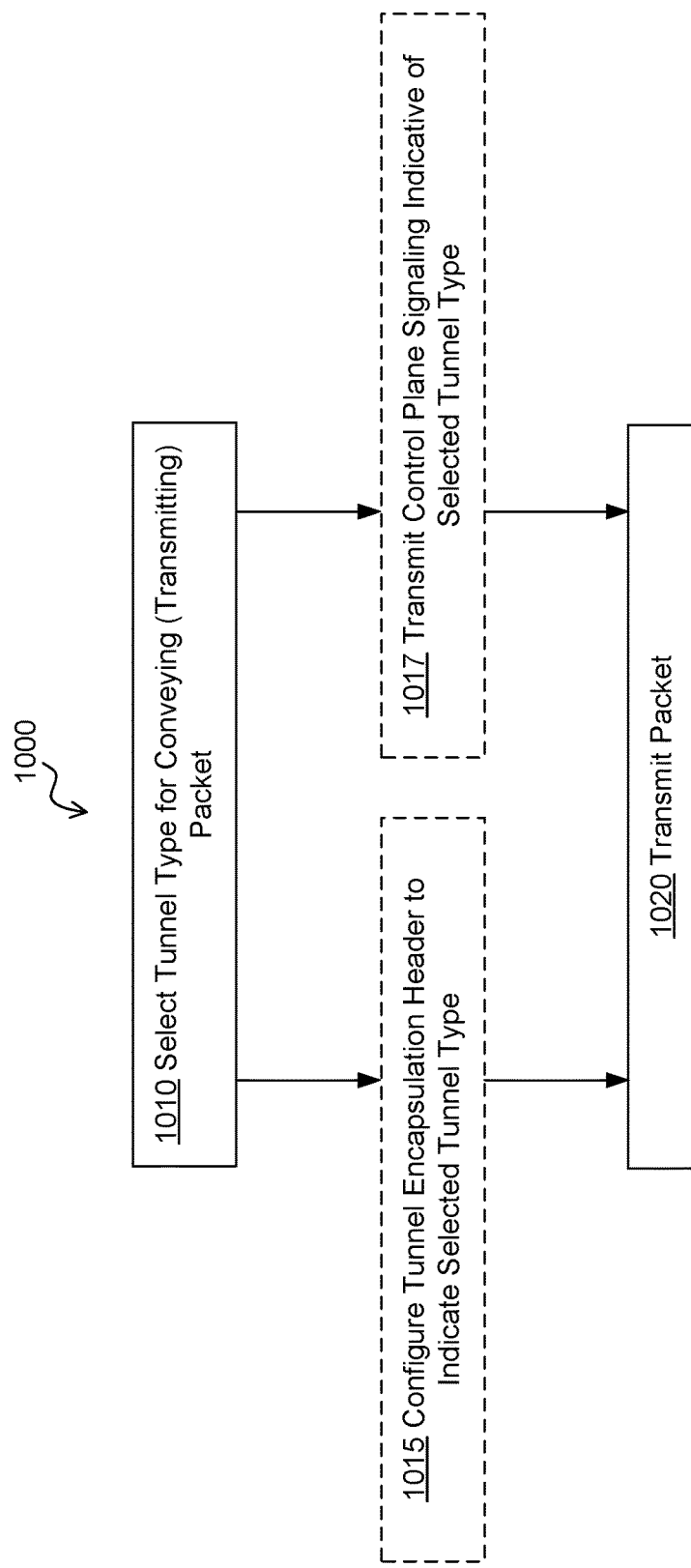
FIG. 10 illustrates operations for transmitting a packet received via a communication network, according to an embodiment of the present invention.

According to other embodiments, and with reference to FIG. 10, there is provided a method 1000 (and associated apparatus) for transmitting a packet via a communication network. The method and apparatus can be used in conjunction with the above-described method and apparatus for receiving packets. Operations of the method and apparatus include selecting 1010, from a plurality of tunnel types, a type of tunnel to be used for conveying the packet. Operations may further include configuring 1015 a tunnel encapsulation header of the packet to indicate the type of tunnel. For example, a message type field in the header may be configured with a value indicative of the type of tunnel. Alternatively, the selecting may be based on received control plane signaling indicating the type of tunnel to be selected. This control plane signaling may also be sent to devices potentially in receipt of the packet. Alternatively, the operations may include transmitting 1017 control plane signaling indicative of the type of tunnel selected, the control plane signaling directly or indirectly received by devices potentially in receipt of the packet. Operations further include transmitting 1020 the packet.

As such, a node can select from among different types of tunnels based on current requirements, and indicate which type of tunnel is being used in transmission of a packet. Furthermore, a node in receipt of a tunneled packet can process the packet in different ways depending on the identified packet type. Because different tunnel types are possible, some tunnel types can be defined which omit unnecessary information, such as unnecessary header fields. This allows for a reduction in communication overhead. In a given situation, a tunnel type can therefore be employed which uses substantially only the header fields that are necessary.

Tunnel types can be pre-defined, and identified using identifiers which are known to receiving devices. Tunnel types can alternatively be described using an identifier which indicates which header fields (e.g. in the encapsulation header) are present and which are absent, and optionally an ordering of the header fields.

According to some embodiments, there is provided a method and apparatus for supporting packet communication via a tunnel in a communication network. Operations of the method and apparatus include, by a control plane function, selecting a tunnel type from a plurality of potential tunnel types. The tunnel type corresponds to the tunnel via which the packets are communicated. The operations further include transmitting a control plane message to one or more user plane nodes functions, where the control plane message includes an indication of the selected tunnel type. In response, the UPFs are configured to process packets communicated via the tunnel according to the indication of the selected tunnel type. This control plane function operation can be used to transmit control plane messages indicative of a tunnel type in use. This approach can be used as an alternative to indicating the tunnel type within a tunnel encapsulation header.

According to some embodiments, there is provided a method and apparatus for processing a packet in a communication network. Operations of the method and apparatus include identifying, from a plurality of tunnel types, a type of a tunnel used for conveying the packet. The identifying is based on content of a received control plane message indicative of the type of the tunnel. The operations further include processing the packet according to the identified type of the tunnel.

Embodiments of the present invention which relate to packet communication using a selected one of a plurality of tunnel types can be used in association with embodiments relating to connecting a UE to a network, and for handling mobile-originated or mobile-terminated packets in a network. In particular, when dealing with an encapsulated packet transmitted from or toward an AN node, the packet can be encapsulated using a selected tunnel type. When the present description refers to use of a tunnel, it should be understood that the above-described operations related to use of a particular selected tunnel type can optionally be used in association with use of such a tunnel.

Embodiments of the present invention can be advantageously adapted to more complex networks which allow for different types of services and devices. For example, some devices, such as machine type communication (MTC) devices may utilize different types of services than smart phones. MTC devices, such as smart meters may transmit relatively small pieces of data. For such services, it is desirable to reduce overhead, as overhead can represent a significant proportion of the transmission, and in some cases, exceed the size of the data to be transmitted. Other types of devices will be able to utilize a variety of different services with different flow types. For example the flows for video streaming services can differ from flows for email. In some cases multiple flows can be allocated to a service, and a user may utilize multiple concurrent services. Accordingly, it is advantageous to utilize different types of tunnels to support different types of flows for different types of services. Embodiments can support the use of different types of tunnels by identifying the tunnel types. In some embodiments, the different tunnel types are identified by a field in the encapsulation header. Other embodiments can identify the different type of tunnels using control plane (CP) signaling. Tunnel types can therefore be selected and used dynamically according to the needs of a given packet or packet flow.

Figure 11:
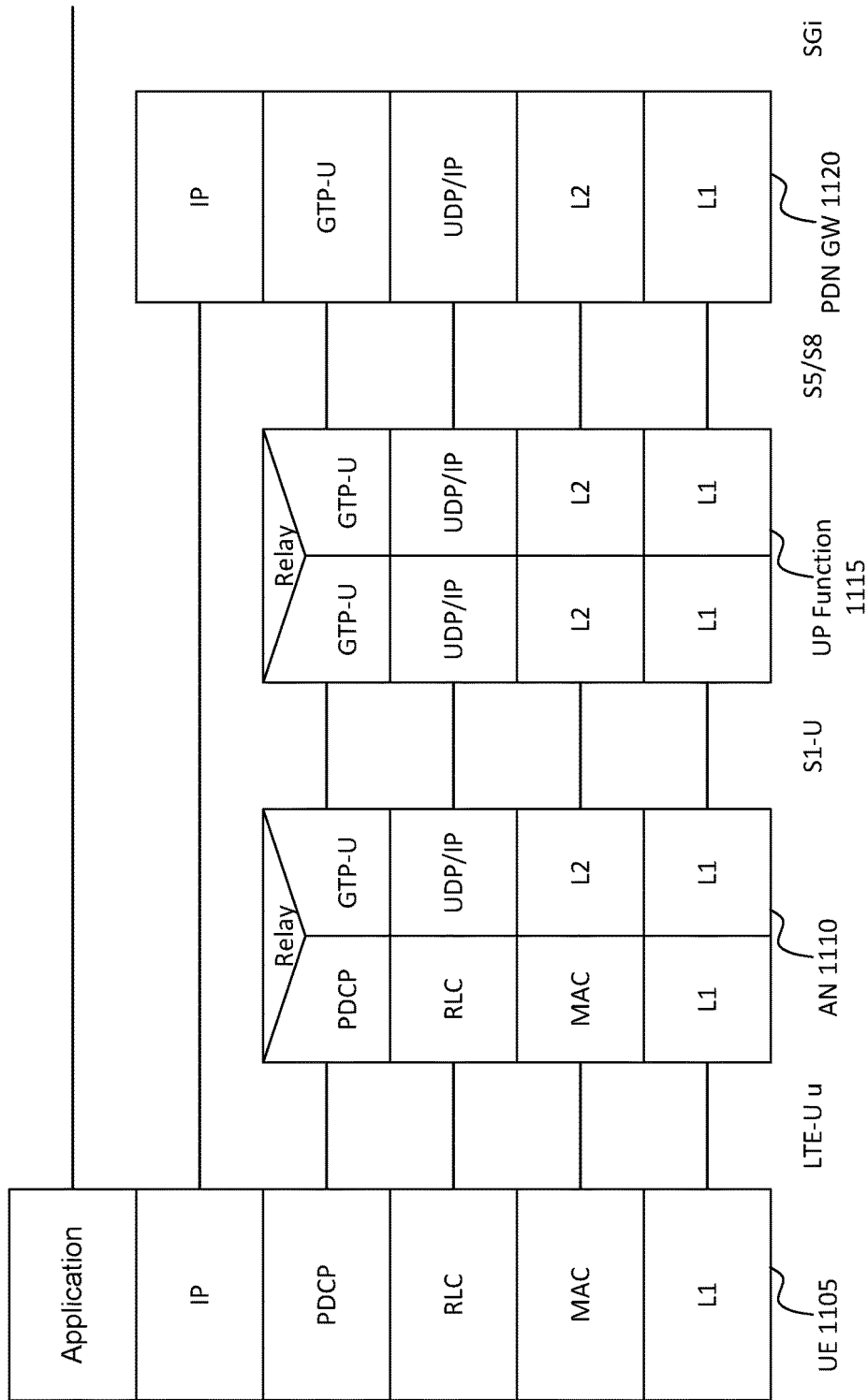
FIG. 11 illustrates an example LTE Data (or User) Plane Protocol.
Figure 12:
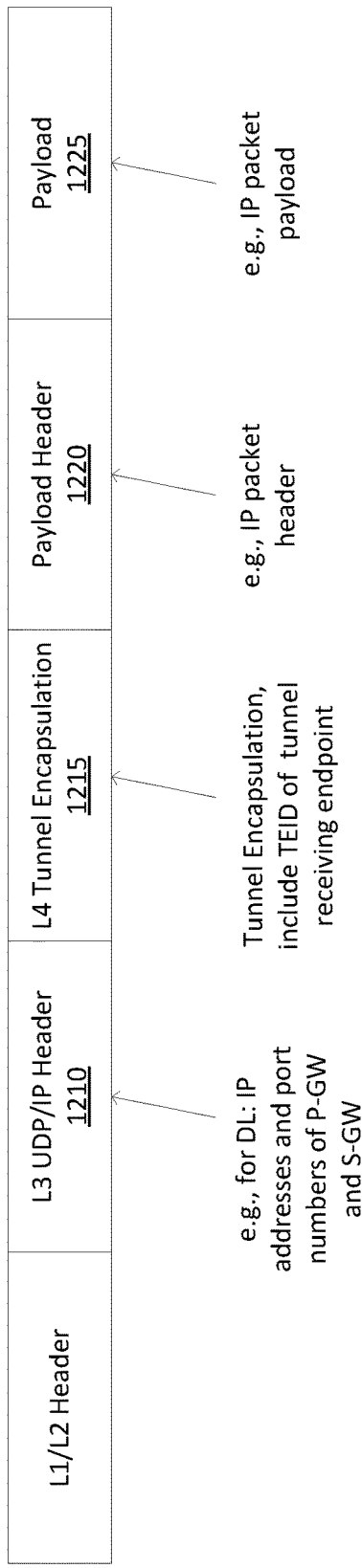
FIG. 12 illustrates an example of the GTP-U packet.

Before providing further details, an existing LTE Data Plane Protocol will be discussed. FIG. 11 illustrates an example LTE Data Plane Protocol. FIG. 12 illustrates an example of the GTP-U packet. Conventionally, the GTP-U protocol is used to provide support for different QoS classes, with a Message Type indicator identifying the type of GTP-U message, and therefore the type of QoS to be applied.

In more detail, FIG. 11 illustrates a UE 1105 communicating with a packet data network gateway (PDN GW) 1120 according to an example scenario. An access node (AN) 1110 such as an eNodeB and a UPF 1115 such as a serving gateway 1115 are used to as intermediaries or relays between the UE 1105 and the PDN GW 1120. Protocol layers employed at each of the UE 1105, AN 1110, UPF 1115, and PDN GW 1120 are shown. The illustrated protocol stacks would be readily understood by a person skilled in the art and include a physical layer (L1 layer), Media Access Control (MAC) layer or L2 layer, Radio Link Control (RLC) layer or User Datagram Protocol over IP (UDP/IP) layer (i.e. Layer 3; L3), Packet Data Convergence Protocol (PDCP) or GTP-U layer (i.e. Layer 4; L4), and an Internet Protocol (IP) layer. The relaying nodes can perform a translation between protocols at one or more layers, and may also perform tunneling, encapsulation and optionally de-encapsulation operations.

FIG. 12 illustrates a particular example of a packet structure as illustrated in FIG. 1. In FIG. 12, the outer IP header 110 of FIG. 1 is identified as a L3 or UDP/IP header 1210, the encapsulation header 115 of FIG. 1 is identified as a L4 tunnel encapsulation header 1215, which includes a tunnel endpoint identifier (TEID) of an endpoint of the L4 tunnel. The PDU header 120 and PDU payload 125 of FIG. 1 are identified as a payload header (e.g. IP packet header) 1220 and payload (e.g. IP packet payload) 1225, respectively.

FIG. 13 is a table of the information carried in the GTP-U L4 tunnel Encapsulation Header 1215, as set out in GTP-U version 1 specified for example in the 3GPP document "TS 29.281; General Packet Radio Systems (GPRS) Tunneling Protocol User Plane (GTPv1-U), version 13.2.0, June 2016, hereinafter referred to as 3GPP TS 29.281. In the table illustrated in FIG. 13:

PT=Protocol Type;
E=Extension Header flag;
S=Sequence Number flag;
PN=N-PDU Number flag;
Message Type: indicates the type of GTP-U message;
Length: indicates the Payload length, including 4 bytes of header after TEID;
Sequence number: optional, set to 0 if no packet ordering is required;
N-PDU: used for inter-RAT operation; and
Next Extension Header Type: Used when more information is required It is noted that the Tunnel Endpoint Identifier (TEID) takes up 4 octets of the header, while the length and sequence number fields take up 2 octets each.

However, such a conventional approach (e.g. to tunneling and encapsulation) has several potential issues. First, tunnels have to be setup for new PDU flows. This can represent significant overhead both in terms of network resources for establishing a flow, and in terms of bandwidth, as such an approach can produce relatively large signaling overhead compared to the amount of data which needs to be transmitted. This is especially relevant for MTC devices, IoT devices, or for short flows which are also often generated by smart phones. Further, current tunnel approaches utilize a QoS Class Identifier (QCI) mechanism for handling congestion of flows but do not facilitate prioritizing differentiation for individual packets in the event of congestion. However, embodiments of the present invention identify tunnel types in the encapsulation header, allowing for a mechanism for dropping lower priority packets in the event of congestion. Accordingly, embodiments of the present invention can support per packet QoS. Furthermore, the current tunnel protocol GTP-U does not provide a flexible approach for providing different tunnel types to accommodate different flow types. For example current tunnels specify QoS for a service. However future networks can allow for multiple flows per service, with each flow having a different QoS level. Accordingly, embodiments of the present invention allow for easily identifying different tunnel types, which can be used to provide flexible approaches in handling different flow types.

In some embodiments, packet handling can include identifying a tunnel type, for example based on content of the encapsulation header, determining packet handling parameters corresponding to the tunnel type, and handling the packet according to the packet handling parameters. The packet handling parameters can include QoS parameters, packet dropping rules such as prioritization, etc. The packet handling parameters can further include information such as the makeup and structure of the header fields, pointers to relevant information in the packet payload, etc.

In some embodiments, per-packet QoS information can be carried for different packets transmitted within the same tunnel. This may facilitate supporting different QoS levels for different users sharing the tunnel. QoS information may be provided on a packet-by-packet basis, for example as carried in the L3 IP packet header or PDU packet Header payload rather than the encapsulation header.

Figure 14:
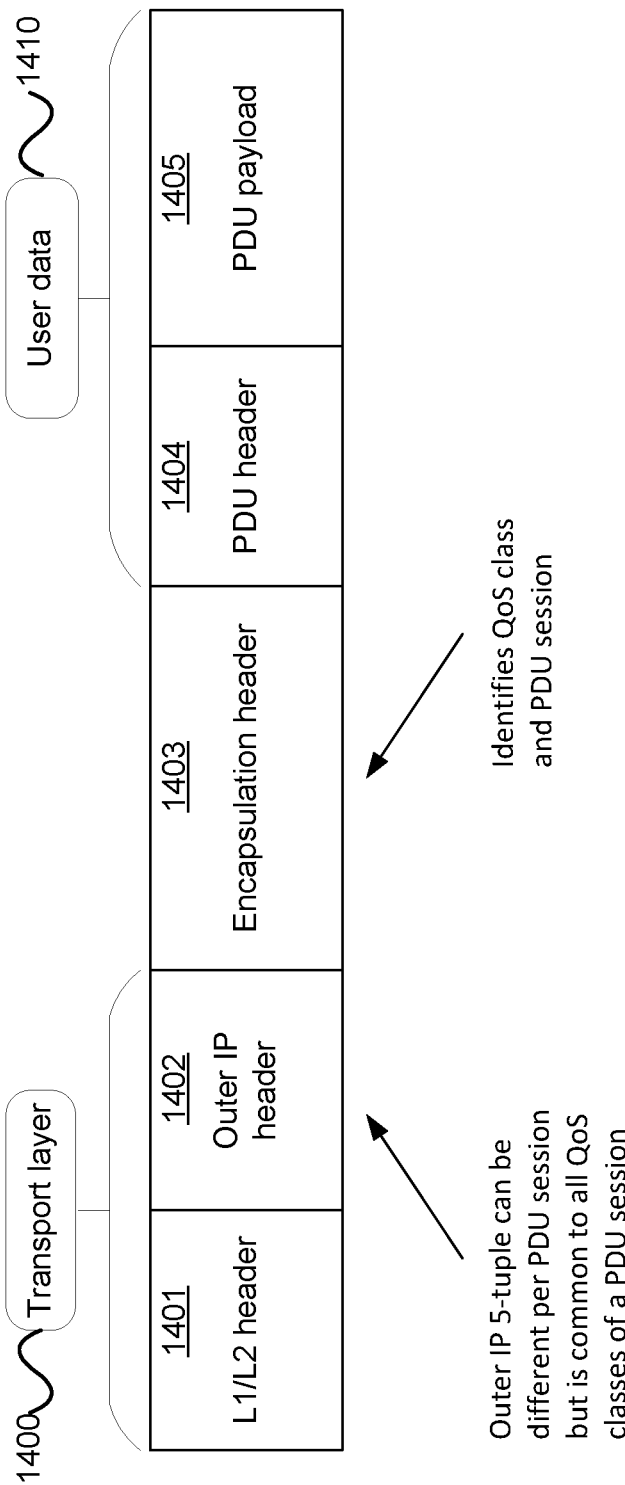
FIG. 14 illustrates an example of a tunnel packet format, according to an embodiment of the present invention.

FIG. 14 illustrates another example of a packet structure according to an embodiment of the present invention. With reference to FIG. 14, an encapsulated packet includes a transport layer 1400, an encapsulation header 1403 and user data 1410. The transport layer 1400 further includes an L1/L2 header 1401 and an outer IP header 1402. The user data further includes a PDU header 1404 and PDU payload 1405. In some embodiments, the encapsulation header 1403 may embed information identifying the tunnel type, which can be used to support different types of tunnel protocols. For example one type of tunnel protocol is a per PDU flow tunnel protocol. In this example, the outer IP header 1402 can include an IP 5-tuple (source and destination addresses and port numbers, and layer 4 protocol indicator) which can be different per PDU session but is common to all QoS classes of a PDU session. Further, in the example of a per PDU flow tunnel protocol, the encapsulation header 1403 identifies the type of tunnel as a per PDU flow tunnel protocol, which identifies the QoS class and the PDU session. The encapsulation header may carry QoS information, such as a QoS Flow ID. The AN or UPF can read the QoS Flow ID and map it to a stored QoS profile specifying packet treatment parameters. Another example of a tunnel protocol is a per PDU session tunnel format (or protocol). The format and encapsulation can be configured as in TR 23.799, section 6.4.10.

Another example is a per node tunnel format (or protocol), which specifies one tunnel per destination. The per-node tunnel format can be defined for example in TR 23.1799, Section 6.4.11. This can be useful for cases where a session is not needed. For example, some MTC communications do not require a session, as a single packet can carry the full transmission message. In this example, the outer IP header 1402 can be selected based on the peer destination/node. Further, in this example of a per node tunnel protocol, the encapsulation header 1403 may not be needed for PDU session identification (as no session may be needed), but the encapsulation header 1403 can carry a QoS marking. In some cases, a tunnel is desired or required and the packet including the transport layer and user data can be transmitted without an outer IP header or encapsulation header. There can be other tunnel types, for example, a per-service tunnel. Accordingly, as will be discussed below, embodiments include a tunnel type identifier in the encapsulation header to identify the type of tunnel, which can include Per-QoS tunnel, per-flow tunnel, per-session tunnel, and per-node tunnel, and other tunnel options. In some cases, when no tunnel is used, the outer IP header 1402 and the encapsulation header 1403 may be omitted.

Accordingly, various embodiments of the present invention provide an explicit indication of Tunnel Type in the encapsulation header 1403. In some embodiments, the fact that the existing (GTP-U version 1 specified in 3GPP TS 29.281) message type field has multiple unused values is utilized to provide the tunnel type indication. That is, previously unassigned values for the message type field can be used to indicate tunnel type by assigning one or more of these values to one or more specified tunnel types. Accordingly some embodiments can utilize the following unused values of the Message Type field for identifying the Type of Tunnel: 8-15, 24, 25, 38-47, 63-69, 71-95, 106-111, 122-127, 242-253.

Depending on the Type of Tunnel, other information can be extracted from the packet. For example, the tunnel type can provide an indication to read other information (e.g. packet fields), for example from the inner PDU header or outer IP header. For example, in case of congestion, a UP function, e.g. a UP gateway, can identify the tunnel type in the encapsulation header and then read the inner IP header to determine session priority. Among multiple packets, a determination of the sessions or flows having lower priority can then be used to determine which packets to drop. For example a UP gateway can use the tunnel type in the encapsulation header, plus the inner IP header to identify packets from a single UE to drop.

In some embodiments, other fields in the tunnel (encapsulation) header can carry different information. For example, for a per-node tunnel: the encapsulation header can carry QoS information using the Sequence Number field because the transmission order of multiple flows is not required. As will be readily understood, the Sequence Number field can be used to indicate a transmission ordering of the packets of the same QoS data flow, and can further be used to detect packet losses and for retransmission request purposes. However, when such capabilities are not needed or are performed by another function, or layer, or another Sequence Number in an encapsulated packet, the Sequence Number field may not be necessary. In some embodiments, the next extension header type field can be used to identify the presence of additional information, which can include routing information, or an UE identifier. In some embodiments, the Octets 9 to 12 in FIG. 13 can carry an UE identifier. As such, embodiments of the present invention include identifying a UE by including a UE ID in, and subsequently reading the UE ID from, an extension header of a packet, or a UE ID field located in the place of one or more existing fields of a packet which are not currently required for carrying other information.

In some embodiments, other fields in the tunnel header can be removed (omitted) to provide for a more compact encapsulation header. For example, since multiple data flows of different UEs are multiplexed in a per-node or per-service tunnels, it is unnecessary to maintain the Sequence number, N-PDU and Next Extension Header Type. Accordingly, embodiments remove (omit) one or more of these fields to reduce the protocol overhead. In some embodiments, omission of such fields will save up to 4 bytes, which is non-negligible for MTC traffic, where the packet size is typically 20 bytes or less. Routers reading the packets are informed of the missing fields by reading the message type indicating the tunnel type does not include the removed fields. FIG. 15 illustrates an example compact header, according to embodiments of the present invention. In FIG. 15, and in contrast to FIG. 13, the Sequence Number, N-PDU Number and Next Extension Header Type fields are omitted. Instead the encapsulation header consists of the following fields: Version, PT, E, S, PN, Message Type, Length, and TEID. The Message Type field can include a code indicating a tunnel type, the fields present, the fields omitted, or a combination thereof.

Figure 16:
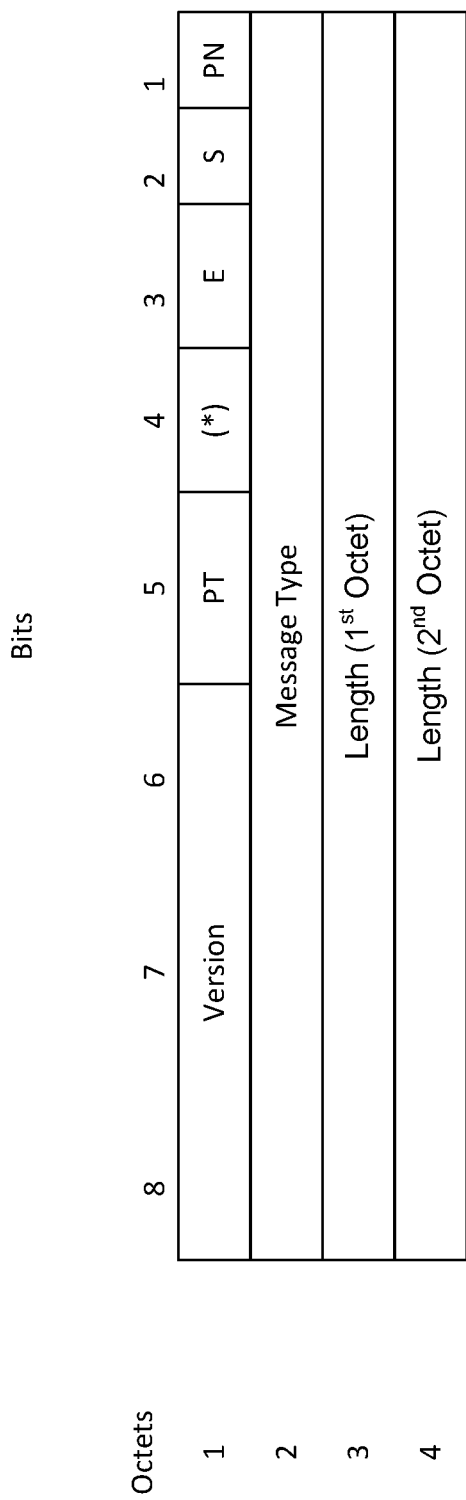

In some cases the tunnel header can be further simplified if the outer UDP/IP header uses different IP addresses or different UDP port to indicate logical tunnel destinations for the UP function processing the packets. In such a case, there is no need to include TEID field in the tunnel header, as illustrated in FIG. 16, which can be suitable for per node based tunnels, according to another embodiment of the present invention. In FIG. 16, and in contrast to FIG. 13, the TEID, Sequence Number, N-PDU Number, and Next Extension Header Type fields are omitted. Instead the encapsulation header consists of the following fields: Version, PT, E, S, PN, Message Type, and Length. For the embodiments of FIGS. 15 and 16, the Message Type field can include a code indicating a tunnel type, the fields present, the fields omitted, or a combination thereof.

In some embodiments, the tunnel type and message type can be combined. For example, in GTP-U protocol, the message type numbered 8 is unused. This unused value can be used to carry tunnel type "per node-level tunnel" and message type "Error Indication". For example the error can indicate the packet was delayed (beyond a threshold) at the tunnel entrance.

Figure 17:
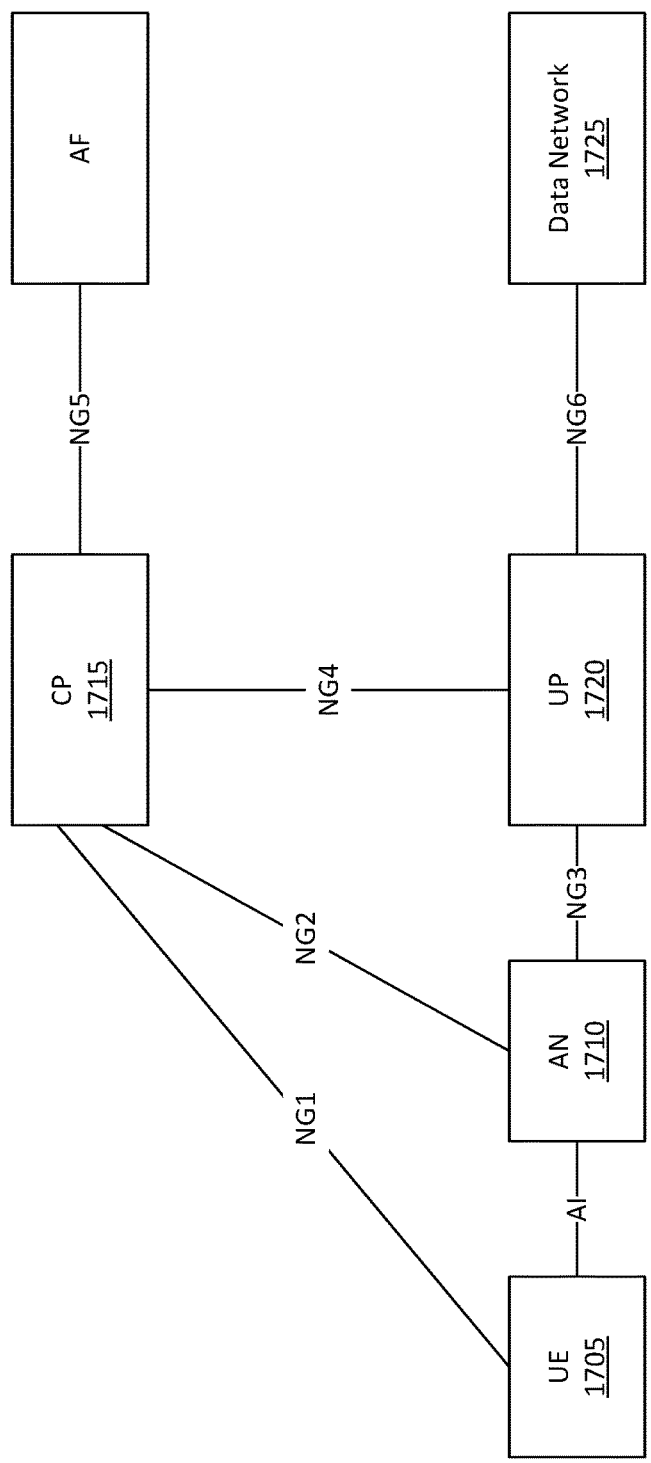
FIG. 17 illustrates an example network, according to an embodiment of the present invention.

In another embodiment, and with reference to FIG. 17, there is provided a network which is configured to provide an indication of the tunnel type using implicit (e.g. control plane) signaling. In such an embodiment, when the session is setup, a Session Management (SM) function in the control plane CP 1715 informs UP functions 1720 of the type of the tunnel. For example, the tunnel type information can be sent from CP 1715 to UP 1720 via a NG4 interface and from CP 1715 to the AN 1710 via a NG2 interface. Routers within the UP will store the tunnel type from the received signaling messages. The UP function 1720 and the AN 1710 are configured to handle tunnel packets between the UE 1705 and the data network 1725 based on the indicated tunnel type. Accordingly, and in some embodiments, when a packet arrives at a router, the router will read other header information depending on the stored tunnel type.

The above embodiments illustrate methods that can be applied to the current GTP-U protocol. Network nodes or network functions can be configured to operate according to the above-described methods. However these methods are not limited to the current GTP-U protocol and the methods disclosed herein can be applied to other (e.g. new) tunnel protocols. For example, a new tunnel protocol can be derived from GTP-U protocol by adding QoS marking bits in the encapsulation header.

Accordingly, according to embodiments of the present invention, networks can be configured to utilize different tunnel types, and UP routers can be informed of the tunnel type, and respond by processing the packets according to tunnel type. In some embodiments, this can reduce overhead signalling while providing a flexible approach.

Accordingly embodiments can potentially offer a variety of benefits. Some embodiments have the advantage of supporting Quality of Service (QoS) treatment on a per packet basis. For example, if tunnel type is for per-node or per-service tunnels, the user plane (UP) functions can determine additional information, for example by examining inner header information (e.g., PDU header) to identify flows. Some embodiments can reduce tunnel overhead for small data services (e.g. MTC), for example by utilizing per node tunnels which can be preconfigured to avoid the overhead of establishing a tunnel for small data transmissions. Some embodiments can reduce the routing complexity by adding routing information to the extension header, such as slice ID, so that the tunnel endpoint can identify the next tunnel to forward packets to.

Embodiments of the present invention comprise operations automatically provided by one or more nodes, functions, or a combination of nodes and functions, forming part of a wireless communication network. Each node or function may be associated with enabling components such as a microprocessor, electronic memory, and communication interface or interfaces. The microprocessor may execute program instructions stored in memory in order to implement the desired functionality of the node or function as described herein. The microprocessor and memory may be at least partially replaced with equivalent electronic components such as digital logic components in some embodiments. Nodes or functions may be operated on dedicated hardware or they may be virtualized, that is made to operate on generic hardware platforms in accordance with a network function virtualization (NFV) framework.

Figure 18A:
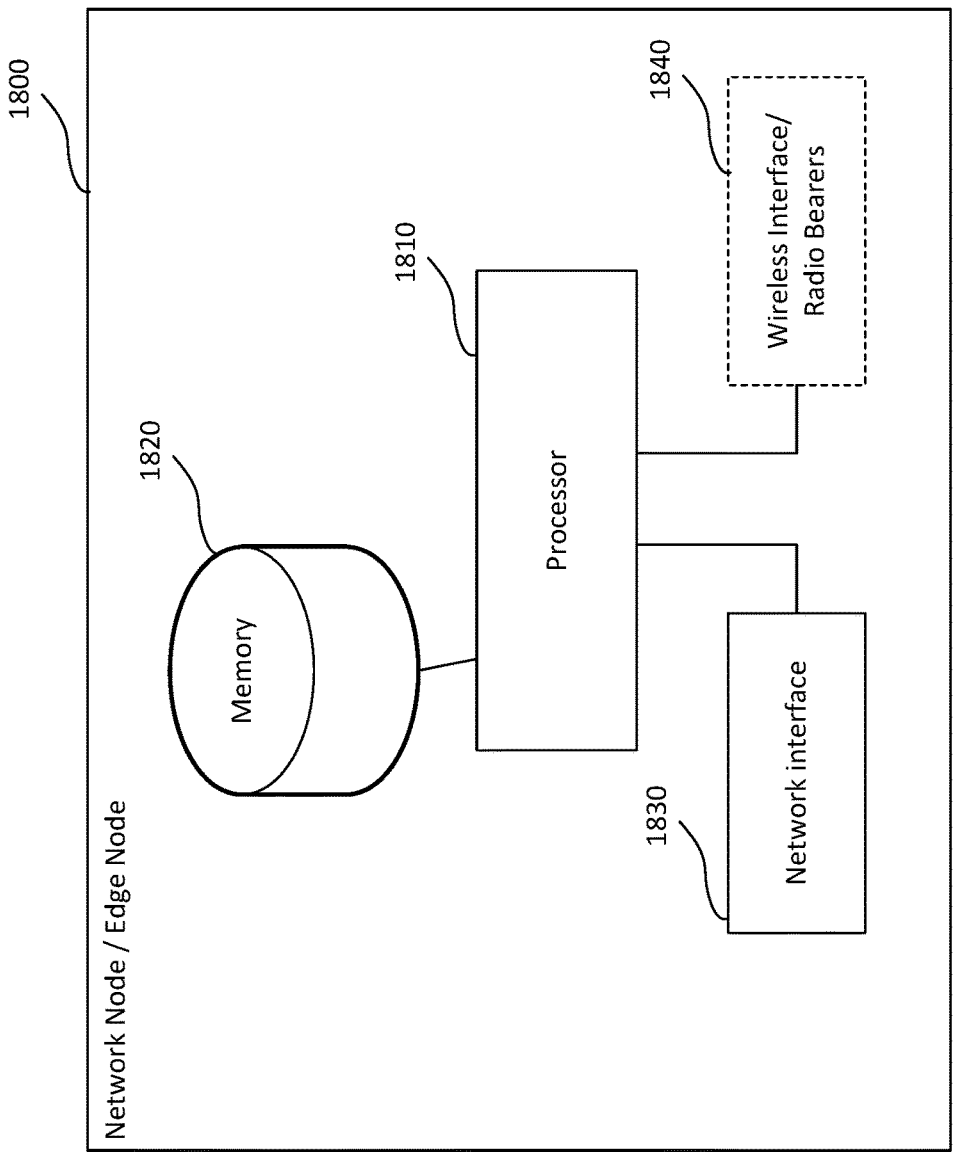
FIGS. 18A and 18B illustrate network nodes provided in accordance with embodiments of the present invention.

FIG. 18A is a block diagram illustrating a network node 1800 for use in carrying out the method and operations as discussed above. Multiple such network nodes may cooperate to implement the present invention. Each network node 1800 may implement one or more functions, such as but not limited to a CP-MM, CP-AU, CP-SM, UP function, user database function, gateway function, CP policy function, AS function, or network management function. A network node 1800 may operate as an edge node, such as an AN node or RA node, in which case the wireless interface or radio bearer interface 1840 is provided.

The network node 1800 includes a network interface 1830 configured to communicate with other network nodes by transmitting and receiving data such as control plane data. The network node 1800 includes a memory 1820 storing program instructions and other information such as state information, database entries, packet data, and operating data, the program instructions including instructions for operating the network node as described herein. Multiple different types of memory may be provided for different uses. The network node 1800 includes a processor 1810 configured to execute the program instructions stored in the memory 1820, for example to process data received by the network interface 1830 and to generate data for transmission by the network interface 830, and otherwise to implement various network functions, method steps, and behaviours of nodes as described herein. In the case of an edge node, the processor 1810 also interacts with a wireless interface 1840 in order to wirelessly transmit and receive data from UEs. Network nodes 1800 may be provided using dedicated hardware, or via network function virtualization, in which components such as the network interface 1830, processor 1810 and memory 1820 are situated in one or more generic hardware platforms and configured to implement the functionality of one or more network nodes.

Figure 18B:
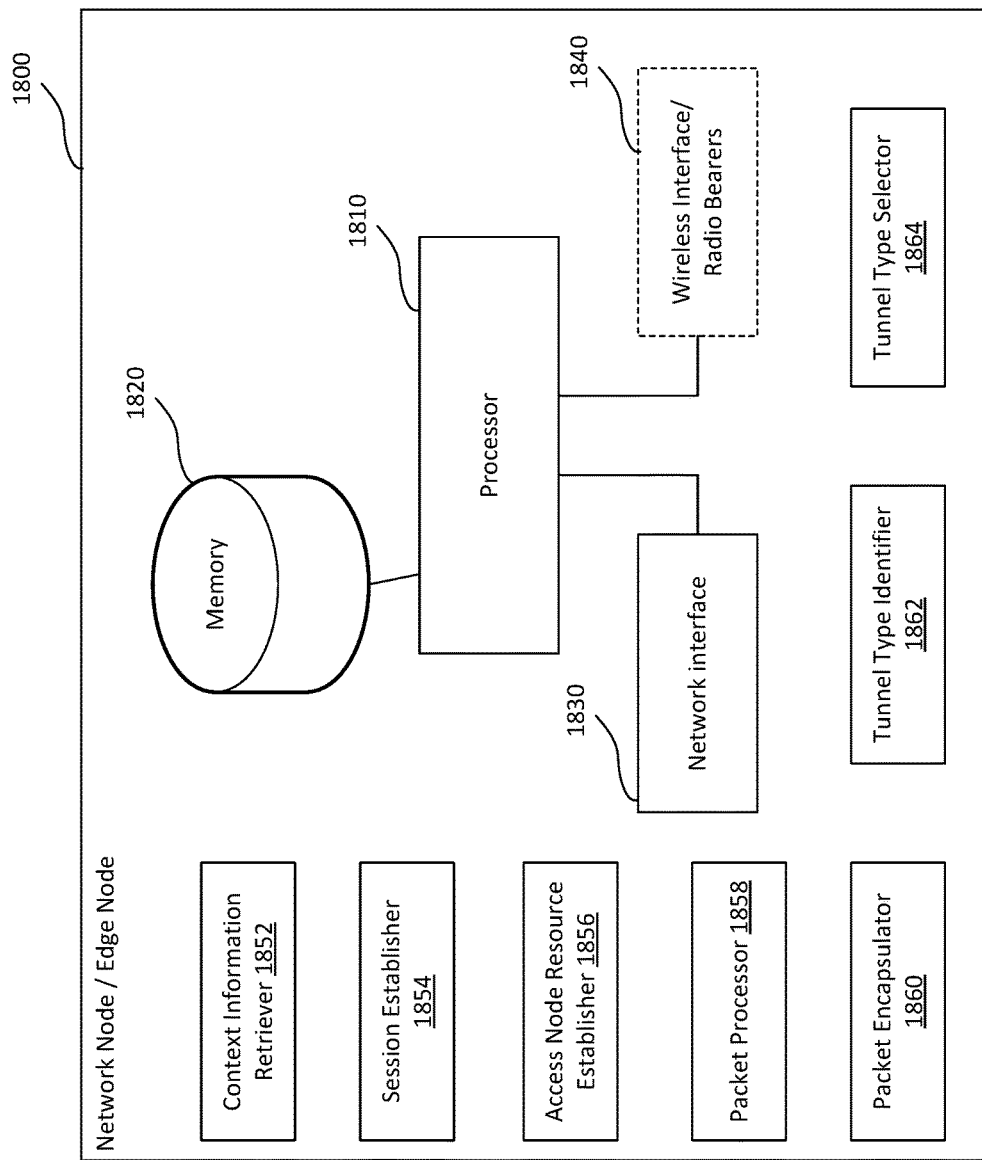

The network node 1800 may include one or more components operable to perform certain actions as described above. The components may be configured to perform method steps as described above, for example. Each component may be instantiated using the processor 1810, the memory 1820, and the network interface 1830. Examples of such components are described below with respect to FIG. 18B, which is a variation of FIG. 18A. Each of the components are applicable in some but not necessarily all embodiments, and each may be omitted when not required. The network node may include a context information retriever 1852 configured to obtain UE context information based on content of an attach request. The network node may include a session establisher 1854 configured to perform session establishment operations as described herein, possibly in conjunction with other network nodes. The network node may include an access node resource establisher 1856 configured to determine and establish access node resources as described herein, possibly in conjunction with other network nodes. The network node may include a packet processor 1858 configured to process received uplink or downlink packets. The network node may include a packet encapsulator 1860 configured to encapsulate received PDU packets for forwarding.

The network node may include a tunnel type identifier 1862 configured to identify, from a plurality of tunnel types, a type of tunnel used for conveying a packet. The type of tunnel may be identified based on content of a tunnel encapsulation header, for example. The tunnel type identifier 1862 may operate on received packets. Alternatively the tunnel type identifier 1862 may operate on packets to be transmitted, by identifying a tunnel type used in transmitting the packet, for example by configuring the tunnel encapsulation header. The network node may include a tunnel type selector 1864 which selects the type of tunnel to be used on packets to be transmitted, and causes the tunnel type identifier to operate on the packets accordingly.

Figure 21:
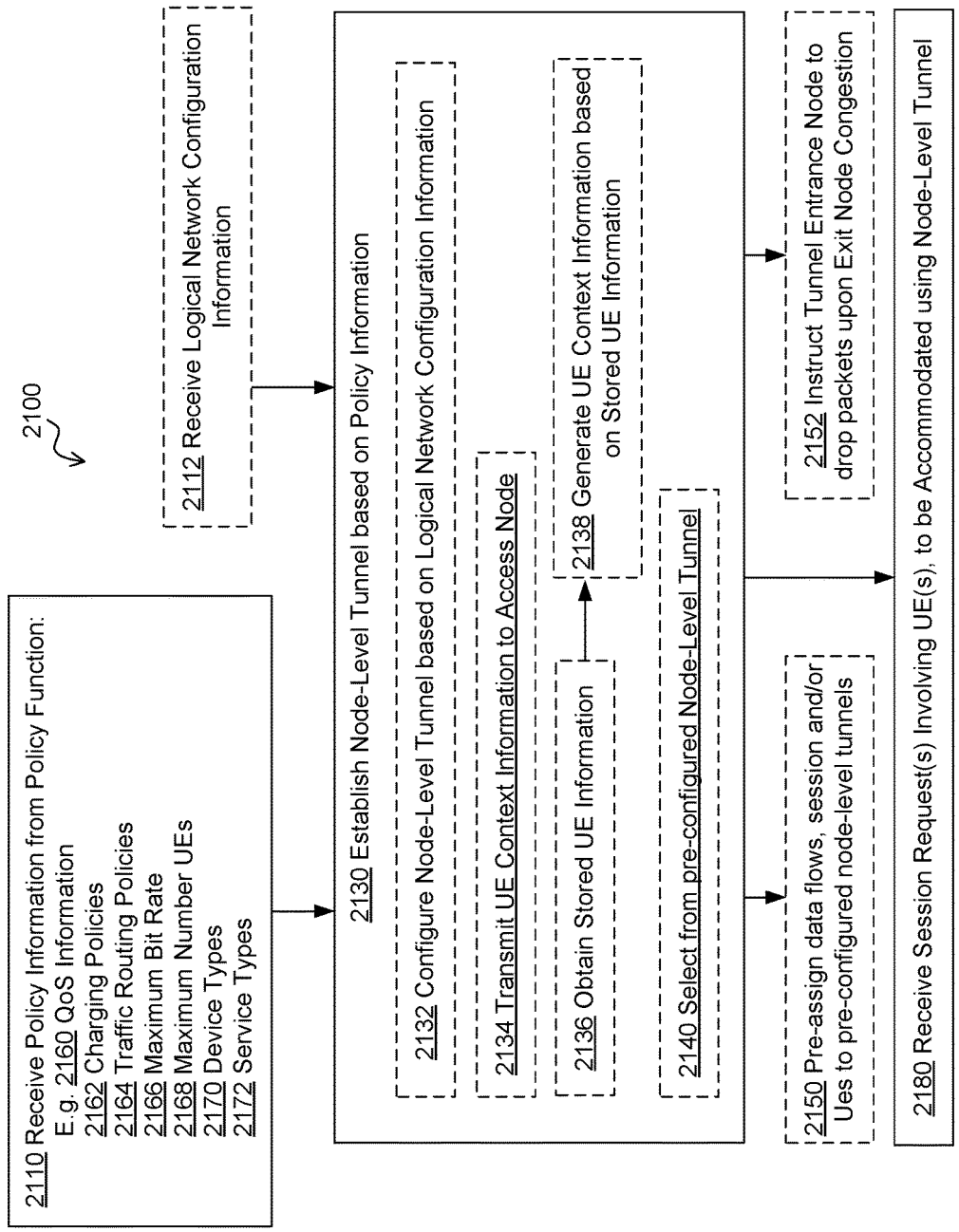
FIG. 21 illustrates a method for providing a node-level tunnel in a communication network, according to an embodiment of the present invention.

FIG. 21 illustrates a method 2100 for providing a node-level tunnel in a communication network, according to an embodiment of the present invention. The method includes, by a session management function operating in the communication network: receiving 2110 policy information from a policy function. The method further includes establishing 2130 the node-level tunnel based on the received policy information. The node-level tunnel is established prior to reception, by the session management function, of session requests involving a User Equipment (UE), the session requests to be accommodated using the node-level tunnel.

The method 2100 may further include receiving 2112 logical network configuration information from a network management function. Establishing 2130 the node-level tunnel may include configuring 2132 the node-level tunnel based on the logical network configuration information. In some embodiments, establishing 2130 the node-level tunnel comprises transmitting 2134, to an access node, context information related to the UE. In some embodiments, establishing 2130 the node-level tunnel comprises obtaining 2136, from a user database, stored information related to the UE, and generating 2138 the context information based on the stored information.

In some embodiments, establishing 2130 the node-level tunnel is performed in response to receipt 2114 of a request message from an access network node.

In some embodiments, establishing 2130 the node-level tunnel further comprises: selecting 2140 one of a plurality of pre-configured node-level tunnels as the node-level tunnel, based on the policy information and further information provided by the access network node; and transmitting an indication of UE context information to the access network node, the UE context information associated with the node-level tunnel.

In some embodiments, the method 2100 further includes pre-assigning 2150, based on the policy information, one or more data flows, session, and UEs to one of a plurality of node-level tunnels, including the node level tunnel.

In various embodiments, after establishing 2130 the node-level tunnel, the method may include receiving 2180 one or more session requests involving UEs, the session requests to be accommodated using the node-level tunnel. As such, the node-level tunnel is established prior to receipt of these session requests.

As also illustrated, in some embodiments, the policy information includes one or more of: Quality of Service (QoS) information 2160 for the UE; charging policies 2162 for the UE; a traffic routing policy 2164 for the UE; a maximum bit rate 2166 to be accommodated by the node-level tunnel; a maximum number of UEs 2168 having traffic carried by the node-level tunnel; a designation 2170 of types of devices to be served by the node-level tunnel; and an indication 2172 of types of services to be served by the node-level tunnel.

In some embodiments, the policy is indicative that, when congestion occurs at an exit node of the node-level tunnel, packets are to be dropped at an entrance node of the node-level tunnel. In this case, the method further comprises instructing 2152 the entrance node to drop packets in response to congestion at the exit node.

Figure 22:
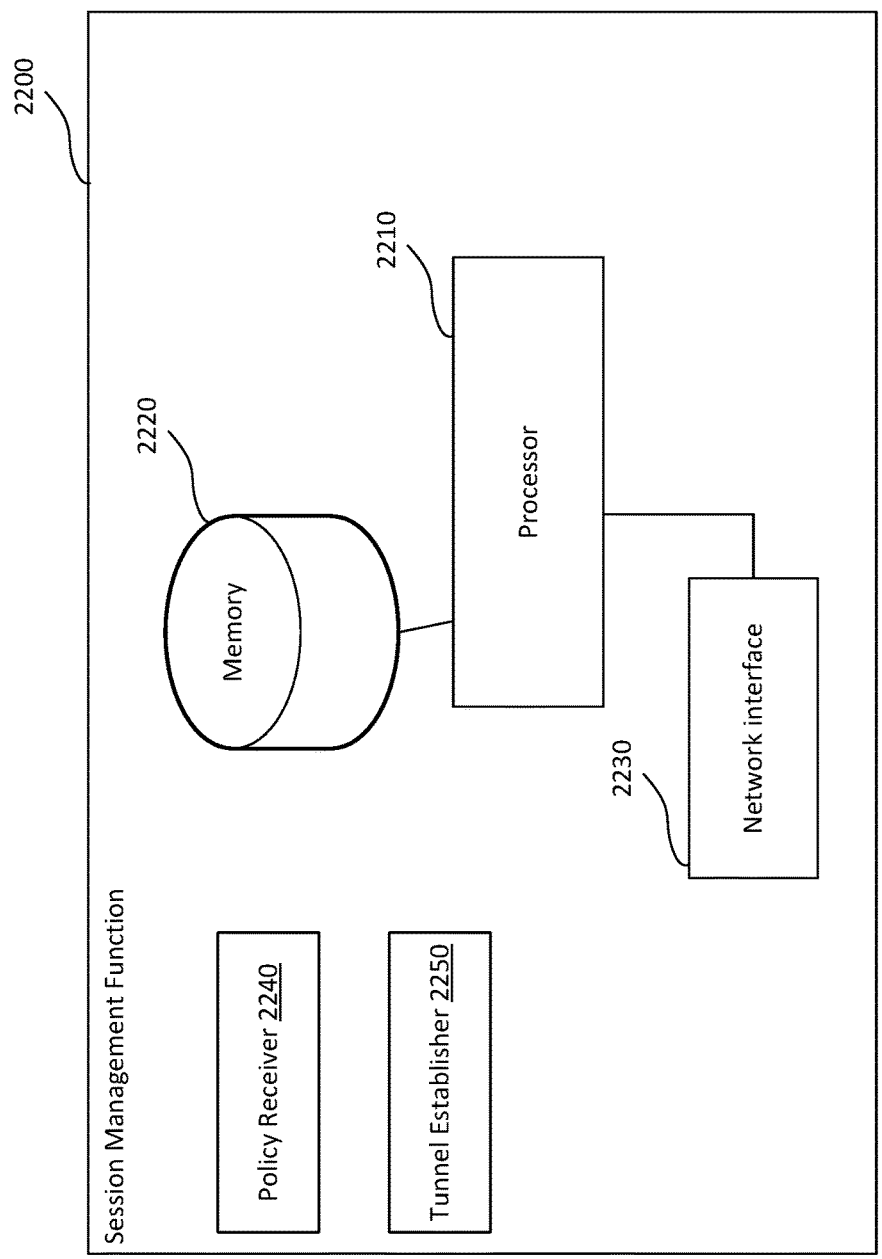
FIG. 22 illustrates an apparatus for providing a node-level tunnel in a communication network, according to an embodiment of the present invention.

FIG. 22 illustrates a session management function 2200 operating in a communication network, according to an embodiment of the present invention. The session management function 2200 is operated using a processor 2210, a memory 2220 and a network interface 2230. The session management function 2200 is configured to receive, via the network interface 2230, policy information from a policy function. The information may be received using a policy receiver 2240. The session management function 2200 is configured to establish, via instructions transmitted through the network interface 2230, a node-level tunnel in the communication network based on the received policy information. The node-level tunnel can be established using a tunnel establisher 2250. The policy receiver 2240 and tunnel establisher 2250 are enabled using the processor 2210, memory 2220 and network interface 2230. Again, the node-level tunnel is established prior to reception, by the session management function, of session requests involving a User Equipment (UE), the session requests to be accommodated using the node-level tunnel. The session management function may be configured to perform various operations corresponding to the method as described above with respect to FIG. 21.

Figure 23:
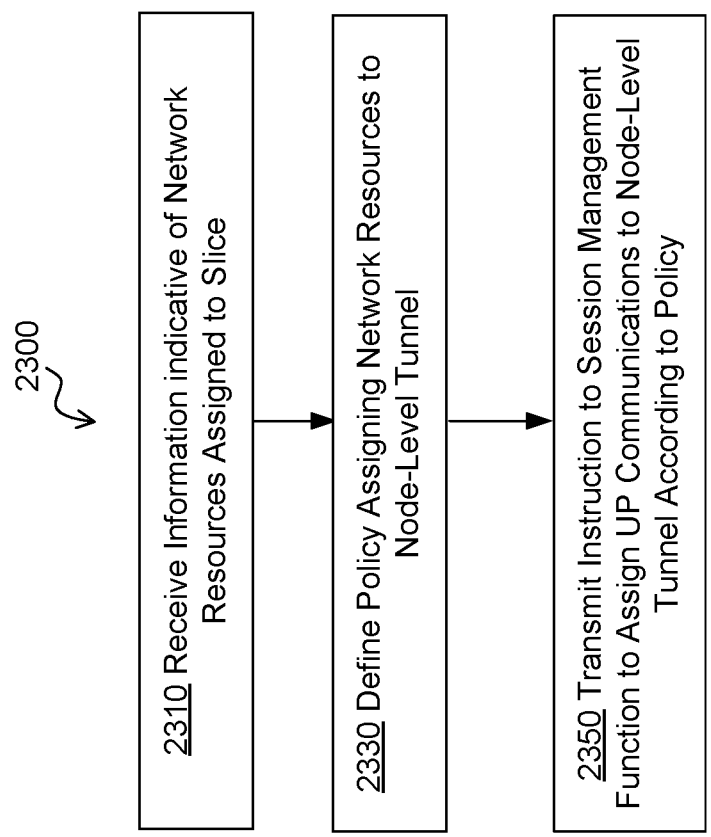
FIG. 23 illustrates a method for providing a node-level tunnel in a communication network, according to another embodiment of the present invention.

Having reference to FIG. 23, a first further aspect of the present invention provides for a method 2300 for providing a node-level tunnel in a communication network, the method comprising, by a policy function operating in the communication network: receiving 2310 information indicative of network resources assigned to a network slice; based on the received information, defining 2330 a policy assigning some of the network resources for use by the node-level tunnel; and transmitting 2350 an instruction to a session management function to assign user plane communications to the node-level tunnel according to the policy.

Figure 24:
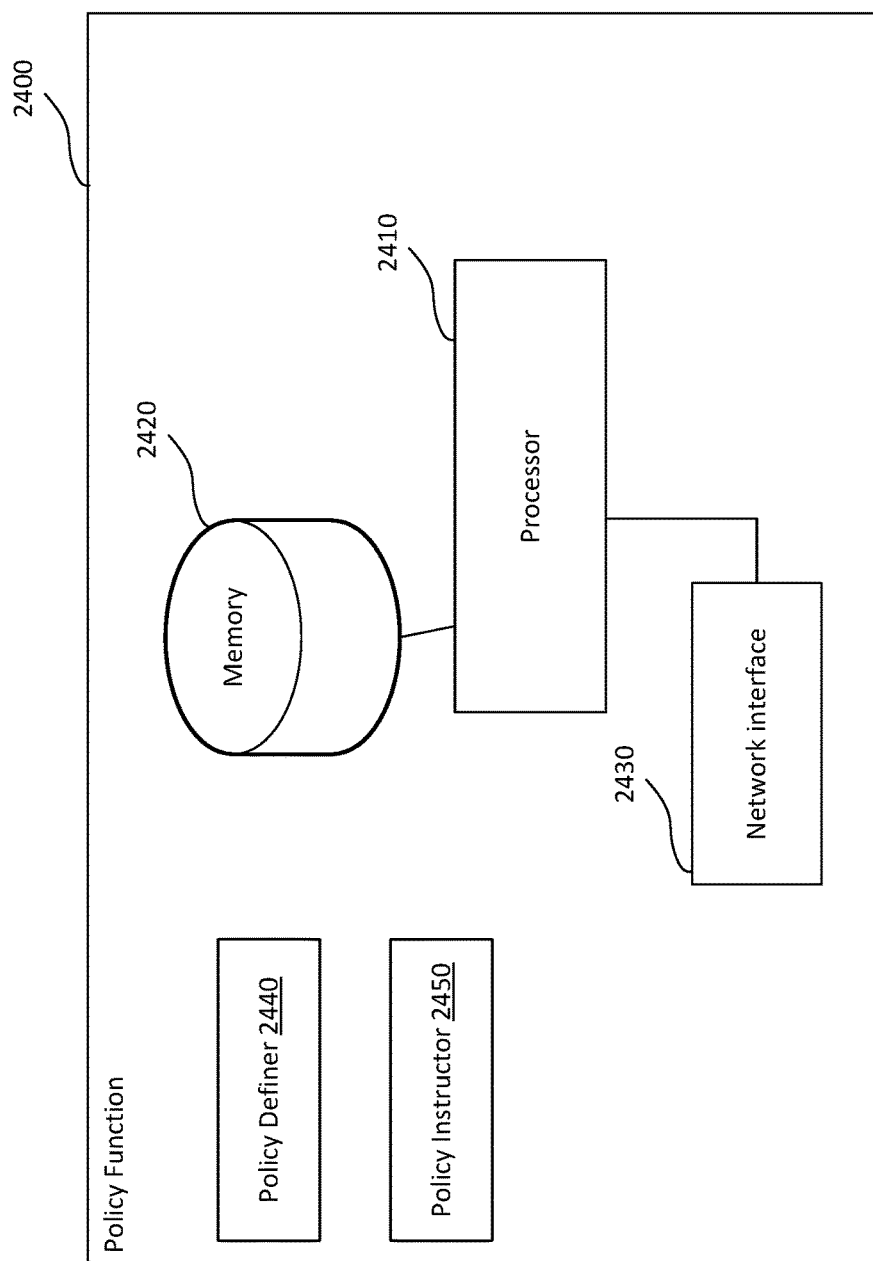
FIG. 24 illustrates an apparatus for providing a node-level tunnel in a communication network, according to another embodiment of the present invention.

Having reference to FIG. 24, the first further aspect may further provide for a policy function 2400 operating in the communication network, the policy function operated using a processor 2410, a memory 2420 and a network interface 2430 and configured to: receive, via the network interface, information indicative of network resources assigned to a network slice; based on the received information, define a policy assigning some of the network resources for use by a node-level tunnel in the communication network, for example using a policy definer 2440; and transmit, via the network interface, an instruction to a session management function to assign user plane communications to the node-level tunnel according to the policy, for example using a policy instructor 2450. The policy definer 2440 and policy instructor 2450 are enabled using the processor 2410, memory 2420 and network interface 2430.

In some embodiments of the first further aspect, the received information is further indicative of usage of the network resources. In some embodiments, the first further aspect further comprises, based on the received information, providing a traffic routing policy for the node-level tunnel. In some embodiments, the first further aspect further comprises receiving traffic information indicative of current network traffic conditions, and providing a traffic routing policy, a QoS policy, or both, for the node-level tunnel based on the traffic information. In some embodiments, the first further aspect further comprises based on the received information, providing a QoS policy, a charging policy, or both, for the node-level tunnel.

In some embodiments, the first further aspect further comprises: receiving additional information from one or more of: a network function; an access node; a user plane function; a network management function; a user database; and a session management function; and defining the policy based on the additional information.

In some embodiments of the first further aspect, the policy is indicative that, when congestion occurs at an exit node of the node-level tunnel, packets are to be dropped at an entrance node of the node-level tunnel. In some embodiments of the first further aspect, the received information is further indicative of a logical or physical topology of the communication network. The policy may define one or more of: traffic steering, QoS settings, and congestion management settings based on the logical or physical topology.

A second further aspect of the present invention provides for a method for processing a packet received via a communication network, comprising: identifying, from a plurality of tunnel types, a type of tunnel used for conveying the packet, the identifying based on content of a tunnel encapsulation header of the packet or based on a received control plane message; and processing the packet according to the identified type of tunnel.

The second further aspect may further provide for a device in a communication network for processing a packet received via a communication network, the device comprising a processor, a memory and a network interface and configured to: identify, from a plurality of tunnel types, a type of tunnel used for conveying the packet, the identifying based on content of a tunnel encapsulation header of the packet or based on a received control plane message; and process the packet according to the identified type of tunnel.

In some embodiments of the second further aspect, the identifying is based on content of a message type field belonging to the tunnel encapsulation header. In some embodiments of the second further aspect, processing the packet comprises reading a UE identifier from a location in the packet, the location determined based on the identified type of tunnel.

A third further aspect of the present invention provides for method for transmitting a packet via a communication network, comprising: selecting, from a plurality of tunnel types, a type of tunnel to be used for conveying the packet; configuring the packet according to the selected type of tunnel; and transmitting the packet.

The third further aspect may further provide for a device in a communication network for transmitting a packet received via a communication network, the device comprising a processor, a memory and a network interface and configured to: select, from a plurality of tunnel types, a type of tunnel to be used for conveying the packet; configure the packet according to the selected type of tunnel; and transmit the packet.

In some embodiments, the third further aspect further comprises configuring a tunnel encapsulation header of the packet to include a value indicative of the type of tunnel. In some embodiments of the third further aspect, the type of tunnel is indicated to a recipient of the packet using a control plane message. In some embodiments of the third further aspect, configuring the packet comprises including a UE identifier at a location in the packet, the location depending on the selected type of tunnel. In some embodiments, the third further aspect further comprises determining a set of required information fields for the packet, and wherein the selected type of tunnel includes the set of required information fields and excludes a maximum number of information fields other than the set of required information fields.

It will be readily understood that, throughout the preceding discussion, the above-described network functionalities and operations may correspond to a method for use in supporting operation of a communication network, such as a 5G wireless communication network. The method may involve computer-implemented functions, namely functions which are implemented by one or more computing, communication or memory components of the network infrastructure, or a combination thereof. These components may take various forms, such as specific servers or general-purpose computing, communication or memory devices, or combinations thereof, which are configured to provide the required functionality through virtualization technologies. The method may involve the operation of one or more network components in order to improve the operation of the network. As such, with the communication network viewed as an apparatus, embodiments of the present invention may be directed to improving internal operations of the communication network.

Further, it will be readily understood that embodiments of the present invention relate to a communication network system or associated apparatus thereof, which is configured to perform the above-described network functionalities and operations. Again, the system or apparatus may comprise one or more computing, communication or memory components of the network infrastructure, or combinations thereof, which may take various forms, such as specific servers or general-purpose computing, communication or memory devices, or combinations thereof, which are configured to provide the required functionality through virtualization technologies. Various methods as disclosed herein may be implemented on one or more real or virtual computing devices, such as devices within a communication network control plane, devices operating in the data plane, or a combination thereof. Computing devices used to implement method operations may include a processor operatively coupled to memory, the memory providing instructions for execution by the processor to perform the method as described herein.

Various embodiments of the present invention utilize one or both of: real computer resources; and virtual computer resources. Such computer resources utilize, at a hardware level, a set of one or more microprocessors operatively coupled to a corresponding set of memory components which include stored program instructions for execution by the microprocessors. Computing resources may be used to provide virtual computing resources at one or more levels of virtualization. For example, one or more given generic computer hardware platforms may be used to provide one or more virtual computing machines. Computer hardware, such as processor resources, memory, and the like, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Figure 19:
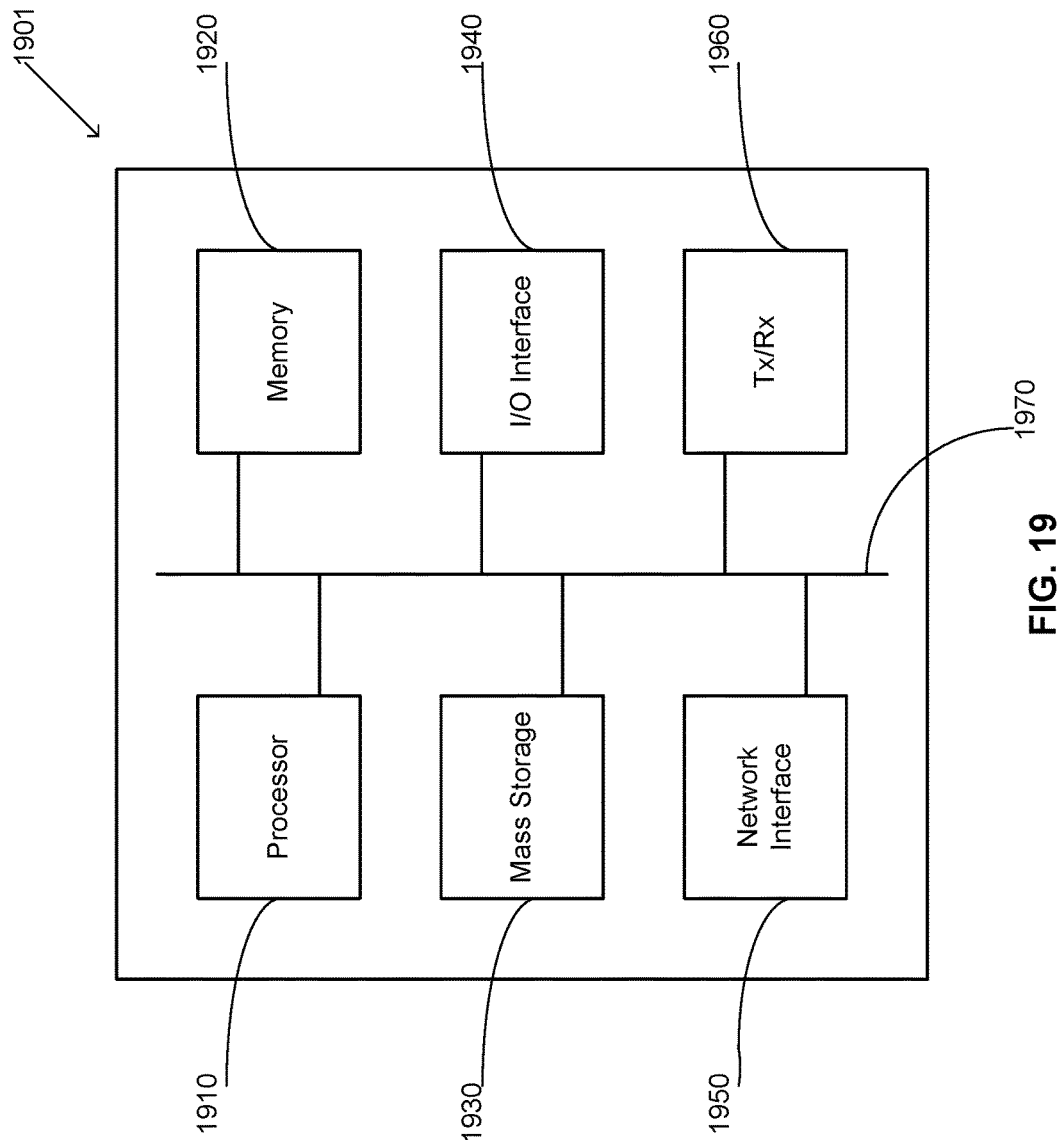
FIG. 19 illustrates an example processing system, according to an embodiment of the present invention.

FIG. 19 is an exemplary block diagram of a processing system 1901 that may be used for implementing the various network functions. As shown in FIG. 19, processing system 1901 includes a processor 1910, working memory 1920, non-transitory storage 1930, network interface, I/O interface 1940, and depending on the node type, a transceiver 1960, all of which are communicatively coupled via bi-directional bus 1970.

According to certain embodiments, all of the depicted elements may be utilized, or only a subset of the elements. Further, the processing system 1901 may contain multiple instances of certain elements, such as multiple processors, memories, or transceivers. Also, elements of processing system 1901 may be directly coupled to other components without the bi-directional bus.

The memory may include any type of non-transitory memory such as static random access memory (SRAM), dynamic random access memory (DRAM), synchronous DRAM (SDRAM), read-only memory (ROM), any combination of such, or the like. The mass storage element may include any type of non-transitory storage device, such as a solid state drive, hard disk drive, a magnetic disk drive, an optical disk drive, USB drive, or any computer program product configured to store data and machine executable program code. According to certain embodiments, the memory or mass storage have recorded thereon statements and instructions executable by the processor for performing the aforementioned functions and steps.

The processing system 1901 can be used to implement a user plane function (UPF) or router or a CP function described herein.

Figure 20:
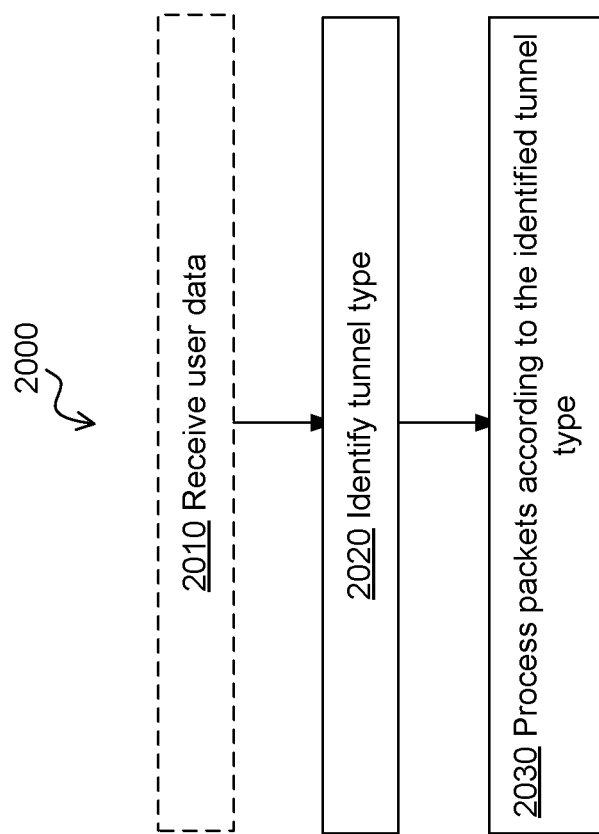
FIG. 20 illustrates a method for processing a packet according to an embodiment of the present invention.

Those skilled in the art will appreciate that this method can be carried out at any number of different UPFs, and may be carried out at the Access Network Node. Having reference to FIG. 20, the process 2000 can start with receiving 2010 user data, such as user data 110, depending on the UPF performing the method. The UPF processes 2030 the packets according to an identified tunnel type. Depending on the UPF, the UPF may first identify 2020 the tunnel type from among plural different potential tunnel types. For example an access node may identify the appropriate tunnel type to use for user data. In which case processing packets can include encapsulating the user data with an encapsulation header which identifies the tunnel type. For intermediate UPFs the packet processing can include reading the encapsulated header to identify the tunnel type and processing the packet in accordance to the identified tunnel type.

Through the descriptions of the preceding embodiments, the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can include the device memory as described above, or stored in removable memory such as compact disk read-only memory (CD-ROM), flash memory, or a removable hard disk. The software product includes a number of instructions that enable a computer device (computer, server, or network device) to execute the methods provided in the embodiments of the present disclosure. For example, such an execution may correspond to a simulation of the logical operations as described herein. The software product may additionally or alternatively include number of instructions that enable a computer device to execute operations for configuring or programming a digital logic apparatus in accordance with embodiments of the present disclosure.

Although the present invention has been described with reference to specific features and embodiments thereof, it is evident that various modifications and combinations can be made thereto without departing from the invention. For example, the CP-MM and CP-SM function can be implemented in one combined MMISM function. In this implementation, the internal messages between CP-MM and CP-SM functions can be omitted. Another example is that the network can be implemented using network slicing. Each network slice can have its own CP functions. In this case, a slice selection (SS) function in the CP can be introduced so that the AN node will send the UE attach request to the CP-SS function first. Then the CP-SM will identify the UE and service request, and forward the UE attach request to a CP-MM function managing the selected slice. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for operating a session management function in a communication network, the method comprising:
receiving, by the session management function, policy information from a policy function, the policy information including a maximum number of UEs having traffic carried by a node-level tunnel; and one or more of: a maximum bit rate to be accommodated by the node-level tunnel; a designation of types of devices to be served by the node-level tunnel; and an indication of types of services to be served by the node-level tunnel; and
establishing, by the session management function, the node-level tunnel between a pair of network nodes or network functions in the communication network based on the received policy information for carrying different types of traffic sent by a group of UEs, wherein the node-level tunnel is shared and accessible by the group of UEs, and wherein the group of UEs comprises a number of UEs that is less than the maximum number of UE;
wherein the node-level tunnel is established prior to reception of any session requests sent by any of the UEs of the group of UEs, the session requests to be accommodated using the node-level tunnel.

2. The method of claim 1, further comprising:
receiving logical network configuration information from a network management function; and
configuring the node-level tunnel based on the logical network configuration information.

3. The method of claim 1, wherein establishing, by the session management function, the node-level tunnel comprises transmitting, to an access node, context information related to the UE.

4. The method of claim 3, wherein establishing, by the session management function, the node-level tunnel further comprises obtaining, from a user database, stored information related to the UE, and generating the context information based on the stored information.

5. The method of claim 1, further comprising associating, by the session management function, the node-level tunnel with context information related to the UE in response to receipt of a request message from an access network node.

6. The method of claim 5, wherein associating, by the session management function, the node-level tunnel with the context information further comprises: selecting one of a plurality of pre-configured node-level tunnels as the node-level tunnel, based on the policy information and further information provided by the access network node; and transmitting an indication of the context information to the access network node.

7. The method of claim 6, wherein the further information includes selection assistance information generated by the access node based on context of an attach request received from the UE.

8. The method of claim 1, further comprising pre-assigning, based on the policy information, one or more data flows, protocol data unit (PDU) sessions, and group of UEs to the node level tunnel.

9. The method of claim 1, wherein the policy information further includes one or more of:
Quality of Service (QoS) information for the group of UEs;
charging policies for the UE; and
a traffic routing policy for the UE.

10. The method of claim 1, wherein the policy is indicative that, when congestion occurs at an exit node of the node-level tunnel, packets are to be dropped at an entrance node of the node-level tunnel, the method further comprising instructing the entrance node to drop packets in response to congestion at the exit node.

11. The method of claim 1, wherein the group of UEs have a predetermined characteristic or wherein the pre-configured node-level tunnel is used to provide a particular service to the UE, the service belonging to a group of services defined by a predetermined characteristic and consisting of less than all services available.

12. The method of claim 1, wherein the node-level tunnel is a common tunnel for traffic between at least one pair of network functions.

13. A session management function in a communication network, the session management function operated using a processor, a memory and a network interface and configured to:
receive, via the network interface, policy information from a policy function, the policy information including a maximum number of UEs having traffic carried by a node-level tunnel and one or more of: a maximum bit rate to be accommodated by the node-level tunnel; a designation of types of devices to be served by the node-level tunnel; and an indication of types of services to be served by the node-level tunnels; and establish, via instructions transmitted through the network interface, the node-level tunnel between a pair of network nodes or network functions in the communication network based on the received policy information for carrying different types of traffic sent by a group of UEs, wherein the node-level tunnel is shared and accessible by the group of UEs, and wherein the group of UEs comprises a number of UEs that is less than the maximum number of UE, wherein the node-level tunnel is established prior to reception of any session requests sent by any of the UEs of the group of UEs, the session requests to be accommodated using the node-level tunnel.

14. The session management function of claim 13, further configured to:

receive, via the network interface, logical network configuration information from a network management function; and configure the node-level tunnel based on the logical network configuration information.

15. The session management function of claim 13, wherein establishing the node-level tunnel comprises transmitting, to an access node, context information related to the UE.

16. The session management function of claim 15, wherein establishing the node-level tunnel further comprises obtaining, from a user database and using the network interface, stored information related to the UE, and generating the context information based on the stored information.

17. The session management function of claim 13, further configured to associate the node-level tunnel with context information related to the UE in response to receipt of a request message from an access network node.

18. The session management function of claim 17, wherein associating the node-level tunnel with the context information further comprises: selecting one of a plurality of pre-configured node-level tunnels as the node-level tunnel, based on the policy information and further information provided by the access network node; and transmitting an indication of the context information to the access network node.

19. The session management function of claim 18, wherein the further information includes selection assistance information generated by the access node based on context of an attach request received from the UE.

20. The session management function of claim 13, further configured to pre-assign, based on the policy information, one or more data flows, protocol data unit (PDU) sessions, and the group of UEs to the node level tunnel.

21. The session management function of claim 13, wherein the policy information further includes one or more of:

Quality of Service (QoS) information for the group of UEs;

charging policies for the UE; and a traffic routing policy for the UE.

22. The session management function of claim 13, wherein the policy is indicative that, when congestion occurs at an exit node of the node-level tunnel, packets are to be dropped at an entrance node of the node-level tunnel, the session management function further configured to instruct the entrance node to drop packets in response to congestion at the exit node.

23. The session management function of claim 13, wherein the group of UEs has a predetermined characteristic, or wherein the pre-configured node-level tunnel is used to provide a particular service to the UE, the service belonging to a group of services defined by a predetermined characteristic and consisting of less than all services available.

24. The session management function of claim 13, wherein the node-level tunnel is a common tunnel for traffic between at least one pair of network functions.

* * * * *